(12) United States Patent
Chow et al.

(10) Patent No.: US 11,790,464 B2
(45) Date of Patent: Oct. 17, 2023

(54) AGGREGATED DISTRIBUTION FOR ENERGY DEMAND RESPONSE

(71) Applicants: TOTAL SOLAR INTERNATIONAL, Courbevoie (FR); NORTH CAROLINA STATE UNIVERSITY, Raleigh, NC (US)

(72) Inventors: Mo-Yuen Chow, Raleigh, NC (US); Alberto Castelo Becerra, Raleigh, NC (US); Wente Zeng, Courbevoie (FR)

(73) Assignees: TOTAL SOLAR INTERNATIONAL, Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 485 days.

(21) Appl. No.: 16/644,360

(22) PCT Filed: Sep. 6, 2017

(86) PCT No.: PCT/US2017/050271
§ 371 (c)(1),
(2) Date: Mar. 4, 2020

(87) PCT Pub. No.: WO2019/050513
PCT Pub. Date: Mar. 14, 2019

(65) Prior Publication Data
US 2020/0202459 A1    Jun. 25, 2020

(51) Int. Cl.
G06Q 50/06 (2012.01)
G06Q 30/0283 (2023.01)
(Continued)

(52) U.S. Cl.
CPC .............. *G06Q 50/06* (2013.01); *F24F 11/46* (2018.01); *G06Q 10/0631* (2013.01);
(Continued)

(58) Field of Classification Search
CPC .............. G06Q 50/06; G06Q 10/0631; G06Q 30/0283; F24F 11/46; H02J 7/0063;
(Continued)

(56) References Cited

U.S. PATENT DOCUMENTS

2007/0282495 A1* 12/2007 Kempton ................ B60L 53/11
701/22
2012/0221491 A1  8/2012 Koshin et al.
(Continued)

FOREIGN PATENT DOCUMENTS

EP       2 498 365 A1     9/2012

OTHER PUBLICATIONS

Navid Rahbari-Asr, et al., "Distributed Real-Time Pricing Control for Large-Scale Unidirectional V2G With Multiple Energy Suppliers", IEEE Transactions on Industrial Informatics, vol. 12, No. 5, Oct. 2016, published on May 17, 2016 (Year: 2016).*
(Continued)

*Primary Examiner* — Thomas C Lee
*Assistant Examiner* — Michael Tang
(74) *Attorney, Agent, or Firm* — Oblon, McClelland, Maier & Neustadt, L.L.P.

(57) ABSTRACT

An aggregated distribution system includes an HVAC controller, a battery controller, and an aggregated data management engine. The aggregated data management engine is configured to retrieve an HVAC energy usage profile and retrieve a battery energy usage profile. The aggregated distribution system also includes distribution engine configured to forward a first set of HVAC dual variables and forward a first set of battery dual variables to a first neighboring unit of the aggregated distribution system, receive one or more additional sets of HVAC dual variables and one or more additional sets of battery dual variables from one or more neighboring units of the aggregated distribution sys-
(Continued)

tem, update the HVAC energy usage profile with the one or more additional sets of HVAC dual vehicles and update the battery energy usage profile with the one or more additional sets of battery dual vehicles.

17 Claims, 14 Drawing Sheets

(51) Int. Cl.
    *F24F 11/46*     (2018.01)
    *G06Q 10/0631*     (2023.01)
    *H02J 7/00*     (2006.01)
    *H02J 3/14*     (2006.01)

(52) U.S. Cl.
    CPC .......... *G06Q 30/0283* (2013.01); *H02J 3/144* (2020.01); *H02J 7/0024* (2013.01); *H02J 7/0063* (2013.01)

(58) Field of Classification Search
    CPC ......... H02J 3/144; H02J 7/0024; Y02B 70/30; Y02B 70/3225; Y04S 20/222; Y04S 20/244
    USPC ............................ 307/20; 700/291, 295, 297
    See application file for complete search history.

(56) References Cited

U.S. PATENT DOCUMENTS

| | | | |
|---|---|---|---|
| 2014/0148960 A1 | 5/2014 | Bhageria et al. | |
| 2015/0295410 A1* | 10/2015 | Hooshmand | G05B 15/02 307/20 |
| 2016/0049830 A1 | 2/2016 | Bhageria et al. | |
| 2017/0194792 A1 | 7/2017 | Zimmanck et al. | |
| 2017/0250539 A1* | 8/2017 | Feng | H02J 3/381 |
| 2018/0254632 A1* | 9/2018 | Elbsat | G05B 19/042 |

OTHER PUBLICATIONS

International Search Report and Written Opinion dated Oct. 19, 2017 in PCT/US2017/050271 filed on Sep. 6, 2017.
European Office Action dated Nov. 30, 2021, in European Patent Application No. 17 768 593.0, 3 pages.

* cited by examiner

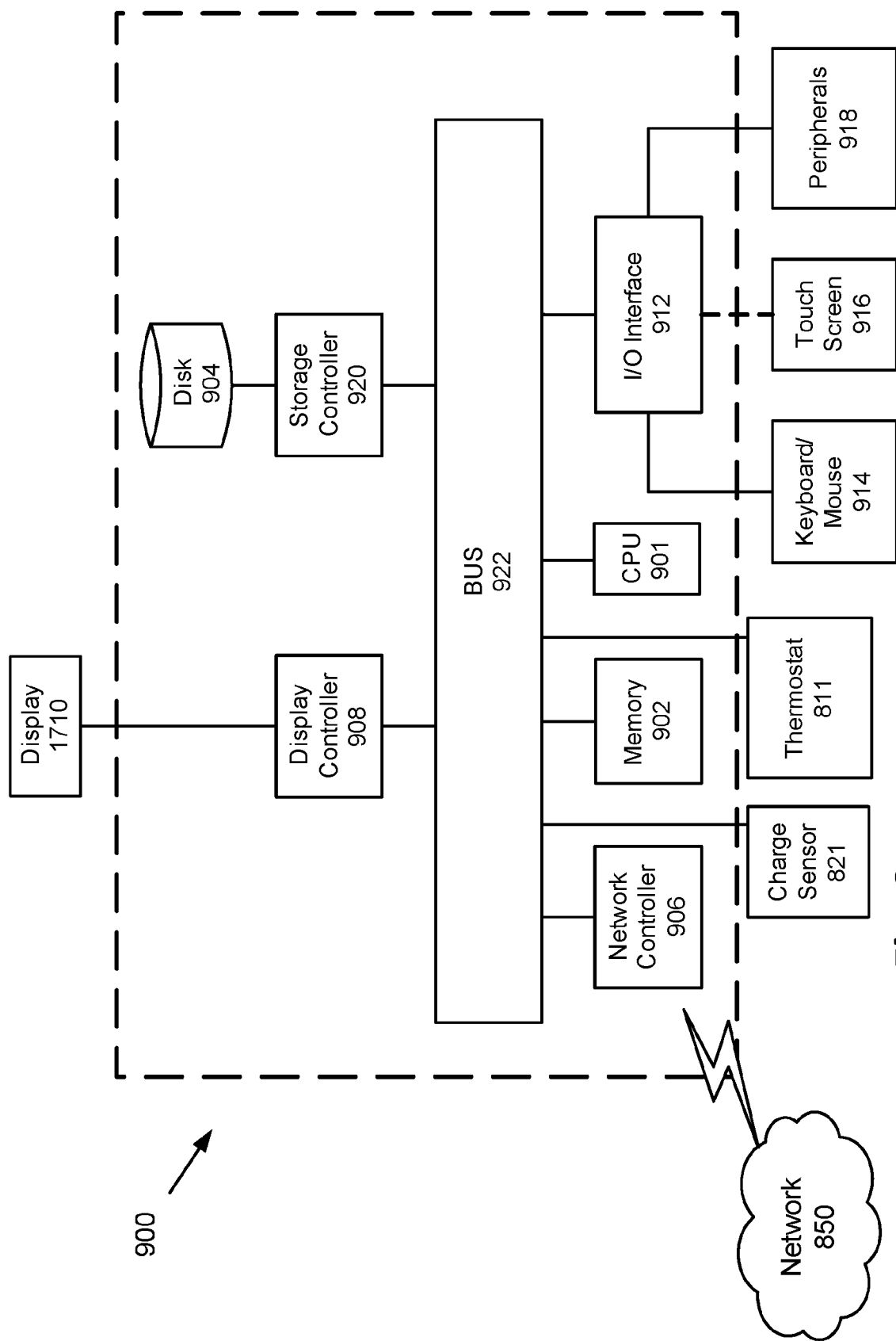

- Determining a utility operating cost for an aggregated cluster of entities within a power grid — 1010

- Calculating an energy storage degradation cost of respective energy storage devices used by the aggregated cluster of entities, wherein the energy storage degradation cost includes one or more local constraints of each energy storage device of the energy storage devices and one or more global constraints for a combination of the energy storage devices — 1020

- Calculating a revenue earned for the aggregated cluster of entities by providing energy from the energy storage devices to the power grid — 1030

- Determining a combined operating cost for the aggregated cluster of entities from a sum of the utility operating cost and the calculated energy storage degradation cost minus the calculated revenue earned — 1040

- Combining the one or more global constraints and respective dual variables to the determined combined operating cost for each entity of the aggregated cluster of entities — 1050

- Updating the dual variables for each entity of the aggregated cluster of entities — 1060

- Forwarding the updated dual variables of said each entity of the aggregated cluster of entities to one or more respective neighboring entities within the aggregated cluster of entities — 1070

- Calculating, via an averaging consensus network, an improved local estimate of the dual variables for said each entity of the aggregated cluster of entities from local estimates of the dual variables from the one or more respective neighboring entities — 1080

- Improving energy resource distribution by executing the improved local estimate of the dual variables for said each entity of the aggregated cluster of entities within the power grid, wherein the improving energy resource distribution reallocates available energy among the aggregated cluster of entities to reduce a load within the power grid — 1090

AGGREGATED DISTRIBUTION FOR ENERGY DEMAND RESPONSE

BACKGROUND

Independent System Operators (ISO) have the obligation to guarantee the reliability of the power grid. Therefore, they need to procure extra capacity to be dispatched during real-time operation, if needed. Typical capacity resources procured by the ISOs in the energy market are those that provide ancillary services. Furthermore, many ISOs have operated Demand Response (DR) Capacity Market to reduce the peak power at the transmission substations. See J. Goodin, "Demand Response & Proxy Demand Resources," *Mech. Eng.*, pp. 1-3, 2011, incorporated herein by reference in its entirety. However, those markets were originally reserved for resources with capacity greater than 100 kW or 500 kW. Distributed Energy Resources (DERs) are usually not able to participate in these markets directly because of their smaller capacity. In this regard, the increasing number of DERs has motivated the emergence of new participants in the energy market called aggregators, whose main goal is to act as a middle manager between the ISO and the DERs. Aggregators can leverage flexibility of the DERs to provide service to the power grid and allow the ISO to simply operate the aggregator's total capacity as a single resource. Recently, new DR programs such as Demand Response Auction Mechanism (DRAM) and those associated with the Reforming the Energy Vision (REV) plan have gradually launched with the objective of leveraging the underused DERs located downstream from the substation to reduce the load at transmission level, avoiding the dispatching of expensive power plants during peak hours.

Residential HVAC units were used initially to reduce the peak load for the utility based on direct load control, where the utility can remotely shut down an HVAC unit if needed, provided the user allows it with a contract beforehand. Other programs seek to reduce the load by implementing a thermostat setback. Under this program, users increase the temperature set point in their thermostat (decrease if the HVAC unit is working on heating mode) based on a price signal. However, when providing DR services to capacity markets, it is needed to make certain that the bid capacity can be guaranteed. Prices also need to be competitive to keep the cost reduced as much as possible. In this regard, direct load control can guarantee that the capacity requirements with the ISO are met. However, its centralized nature highly penalizes scalability, the consumers' privacy, and the system's robustness due to the existence of a single-point-of-failure. On the other hand, thermostat setback approaches are decentralized, but they cannot guarantee the capacity requirements since there is not synchronization between households.

As battery technology has evolved and its cost continues to drop, more Distributed Energy Storage Devices (DESD) are being deployed at buildings and households to provide local services to the owners, such as energy back up and energy arbitrage. However, these behind-the-meter batteries are usually underused if they only provide local services. In order for DESD to be more economically viable, they need to capture more revenue streams. See A. A. Akhil, G. Huff, A. B. Currier, B. C. Kaun, D. M. Rastler, S. B. Chen, A. L. Cotter, D. T. Bradshaw, and W. D. Gauntlett, "SANDIA REPORT DOE/EPRI Electricity Storage Handbook in Collaboration with NRECA." The aggregation of DESDs to provide DR service to the power grid opens up new possibilities for behind-the-meter batteries, allowing the owners to increase the return on their investment and also accelerate the penetration of DESDs in the distribution system.

A primary challenge for the aggregation of a large fleet of DERs is the design control algorithms. In Kim et al., Kim et al. propose an optimal decentralized scheduling algorithm to provide DR using DERs, such as batteries. See S. J. Kim and G. B. Giannakis, "Scalable and robust demand response with mixed-integer constraints," *IEEE Trans. Smart Grid*, vol. 4, no. 4, pp. 2089-2099, 2013, incorporated herein by reference in its entirety. However, their approach is based on complex Mixed-Integer Programming and their system still requires a central controller to coordinate the devices. Similarly, in Mhanna et al., Mhanna et al. present another decentralized algorithm for DER scheduling in DR. Even though the algorithm provides a fast solution, the authors sacrifice optimality by stopping before convergence. See S. Mhanna, A. C. Chapman, and G. Verbic, "A Distributed Algorithm for Large-Scale Demand Response Aggregation," *IEEE Trans. Smart Grid*, pp. 1-8, 2015, incorporated herein by reference in its entirety. Another decentralized algorithm is proposed by Floch in Floch et al. for optimal scheduling of EV charging. Algorithms presented in Kim et al., Mhanna et al., and Floch et al. rely on the Lagrangian Relaxation method to avoid having a central controller. See C. Le Floch, F. Belletti, and S. Moura, "Optimal Charging of Electric Vehicles for Load Shaping: a Dual Splitting Framework with Explicit Convergence Bounds," *IEEE Trans. Transp. Electrif.*, vol. 7782, no. c, pp. 1-9, 2016, incorporated herein by reference in its entirety. However, these approaches still require a central coordinator and the private information of each DER is disclosed. Furthermore, the whole system may face a single-point-of-failure in the coordinator. A fully distributed algorithm for DER control have been proposed in Rahbari-Asr et al. to optimally schedule a set of DESDs in a connected microgrid. See N. Rahbari-Asr, Y. Zhang, and M.-Y. Chow, "Cooperative distributed scheduling for storage devices in microgrids using dynamic KKT multipliers and consensus networks," *IEEE Power Energy Soc. Gen. Meet.*, vol. 2015-September, 2015, incorporated herein by reference in its entirety. However, its objective is to minimize the operational cost of the microgrid, and it does not provide any services to the microgrid.

Furthermore, a battery requires a high capital investment and it usually needs to be replaced when its capacity degrades to 80% of its rated capacity. Therefore, it is important to consider the degradation effect that the control actions have over the batteries in order to maximize its life-span.

SUMMARY

Embodiments described herein include the following aspects.

(1) A first method of improving energy resource distribution includes determining a utility operating cost for an aggregated cluster of entities within a power grid; calculating an energy storage degradation cost of respective energy storage devices used by the aggregated cluster of entities, wherein the energy storage degradation cost includes one or more local constraints of each energy storage device of the energy storage devices and one or more global constraints for a combination of the energy storage devices; calculating a revenue earned for the aggregated cluster of entities by providing energy from the energy storage devices to the power grid; determining a combined operating cost for the aggregated cluster of entities from a sum of the utility operating cost and the calculated energy storage degradation cost minus the calculated revenue earned; combining the one or more global constraints and respective dual variables with the determined combined operating cost for each entity of the aggregated cluster of entities; updating the dual variables for each entity of the aggregated cluster of entities; forwarding the updated dual variables of said each entity of the aggregated cluster of entities to one or more respective neighboring entities within the aggregated cluster of entities; calculating, via an averaging consensus network, an improved local estimate of the dual variables for said each entity of the aggregated cluster of entities from local estimates of the dual variables from the one or more respective neighboring entities; and improving energy resource distribution by executing the improved local estimate of the dual variables for said each entity of the aggregated cluster of entities within the power grid, wherein the improving energy resource distribution reallocates available energy among the aggregated cluster of entities to reduce a load within the power grid.

(2) The first method of improving energy resource distribution of (1), wherein the one or more local constraints include one or more of energy limits of the energy storage devices, power limits of the energy storage devices, and power limits of the power grid.

(3) The first method of improving energy resource distribution of either one of (1) or (2), wherein the energy storage devices include one or more batteries.

(4) The first method of improving energy resource distribution of any one of (1) through (3), further includes applying a Dual Decomposition method to derive an iteration of said each entity of the aggregated cluster of entities to calculate a local estimation of a net energy exchange.

(5) The first method of improving energy resource distribution of any one of (1) through (4), wherein the aggregated cluster of entities includes an aggregated cluster of individual households or an aggregated cluster of individual businesses.

(6) A second method of improving energy resource distribution includes setting one or more local constraints in fulfilling an energy demand response commitment to a power grid that affects each entity of an aggregated cluster of entities individually; setting one or more global constraints in fulfilling the energy demand response commitment that affects the aggregated cluster of entities, wherein the one or more global constraints affect the aggregated cluster of entities as a combined group; calculating a weighted sum of a utility charge for said each entity of the aggregated cluster of entities subject to the one or more local constraints; calculating a weighted sum of a penalty for modifying a temperature set point during the energy demand response commitment for said each entity of the aggregated cluster of entities subject to the one or more local constraints; calculating a weighted aggregation of an amount of imported power reduced by an amount of capacity commitment power during the energy demand response commitment for said each entity of the aggregated cluster of entities subject to the one or more global constraints; updating a local estimation of dual variables for said each entity of the aggregated cluster of entities, wherein the dual variables are a function of the calculated weighted aggregation; forwarding the updated local estimation of the dual variables for said each entity of the aggregated cluster of entities to one or more respective neighboring entities within the aggregated cluster of entities; calculating, via an averaging consensus network, an improved local estimation of the dual variables for said each entity of the aggregated cluster of entities from local estimations of the one or more respective neighboring entities; and improving energy resource distribution by executing the improved local estimation of the dual variables for said each entity of the aggregated cluster of entities with the power grid, wherein the improving energy resource distribution reallocates available energy among the aggregated cluster of entities to reduce a load within the power grid.

(7) The second method of improving energy resource distribution of (6), wherein the one or more local constraints include one or more of a thermal model, a dead-band control model, avoiding a continuous change in temperature set points, a set of temperature set point limits, and an on/off status of a thermostatically-controlled appliance (TCA).

(8) The second method of improving energy resource distribution of either one of (6) or (7), wherein the TCA includes one or more of a heating ventilation and air conditioning (HVAC) unit, a water heater, a water boiler, a heat pump, and an electrical heating system.

(9) The second method of improving energy resource distribution of any one of (6) through (8), wherein the one or more global constraints include a difference between a first amount of energy used during a non-energy demand response commitment and a second amount of energy used during an energy demand response commitment.

(10) The second method of improving energy resource distribution of any one of (6) through (9), wherein the aggregated cluster of entities includes an aggregated cluster of individual households or an aggregated cluster of individual businesses.

(11) The second method of improving energy resource distribution of any one of (6) through (10), wherein said setting the one or more local constraints and said setting the one or more global constraints are achieved via controlling a heating ventilation and air conditioning (HVAC) unit for said each entity of the aggregated cluster of entities.

(12) The second method of improving energy resource distribution of any one of (6) through (11), wherein said setting the one or more local constraints and said setting the one or more global constraints are implemented via the HVAC unit for said each entity of the aggregated cluster of entities for one of a heating mode and a cooling mode.

(13) An aggregated distribution system includes an HVAC controller configured to retrieve an HVAC energy usage profile; a battery controller configured to retrieve a battery energy usage profile; and an aggregated data management engine. The aggregated data management engine has processing circuitry configured to retrieve the HVAC energy usage profile from the HVAC controller, and retrieve the battery energy usage profile from the battery controller. The aggregated distribution system also includes a distribution engine. The distribution engine has processing circuitry configured to forward a first set of HVAC dual variables and forward a first set of battery dual variables to a first neighboring unit of the aggregated distribution system via a communications network, receive one or more additional sets of HVAC dual variables and one or more additional sets of battery dual variables from one or more neighboring units of the aggregated distribution system via the communications network, update the HVAC energy usage profile with the one or more additional sets of HVAC dual variables, and update the battery energy usage profile with the one or more additional sets of battery dual variables. The aggregated distribution system also includes an HVAC unit configured to execute, via the HVAC controller, the updated HVAC energy usage profile to the power grid; and a battery configured to execute, via the battery controller, the updated battery energy usage profile to the power grid. The updated HVAC energy usage profile and the updated battery energy usage profile improves energy resource distribution by reallocating available energy among the aggregated distribution system to reduce a load within the power grid.

(14) The aggregated distribution system of (13), wherein the HVAC controller comprises circuitry configured to set one or more HVAC local constraints in fulfilling an energy demand response commitment during the response demand period that affects each of the HVAC units individually; set one or more HVAC global constraints in fulfilling the energy demand response commitment that affect the aggregated cluster of HVAC units, wherein the one or more global constraints affect the aggregated cluster of HVAC units as a combined group; calculate a weighted sum of a utility charge for said each of the HVAC units subject to the one or more local constraints; calculate a weighted sum of a penalty for modifying a temperature set point during the energy demand response commitment for said each of the HVAC units subject to the one or more local constraints; calculate a weighted aggregation of an amount of imported power reduced by an amount of capacity commitment power during the energy demand response commitment for said each of the HVAC units subject to the one or more global constraints; update a local estimation of dual variables for said each of the HVAC units, wherein the dual variables are a function of the weighted aggregation; and forward the updated local estimation of the dual variables of said each of the HVAC units to one or more respective neighboring HVAC units within the aggregated cluster of HVAC units.

(15) The aggregated distribution system of either one of (13) or (14), wherein the one or more HVAC local constraints include one or more of a thermal model, a dead-band control model, avoiding a continuous change in temperature set points, a set of temperature set point limits, and an on/off status of the HVAC unit.

(16) The aggregated distribution system of any one of (13) through (15), wherein the one or more HVAC global constraints include a difference of a first amount of energy used during a non-energy demand response commitment and a second amount of energy used during the energy demand response commitment.

(17) The aggregated distribution system of any one of (13) through (16), wherein the battery controller comprises circuitry configured to determine a utility operating cost for an aggregated cluster of batteries within a power grid; calculate an energy storage degradation cost of the aggregated cluster of batteries, wherein the energy storage degradation cost includes one or more battery local constraints of each of the batteries and one or more battery global constraints for the aggregated cluster of batteries; calculate a revenue earned for the aggregated cluster of batteries by providing energy obtained from the aggregated cluster of batteries to the power grid; determine a combined operating cost for the aggregated cluster of batteries from a sum of the utility operating cost and the energy storage degradation cost minus the revenue earned; update dual variables for each battery of the aggregated cluster of batteries; and forward the updated dual variables of said each battery of the aggregated cluster of batteries to one or more respective neighboring batteries within the aggregated cluster of batteries.

(18) The aggregated distribution system of any one of (13) through (17), wherein the one or more battery local constraints include one or more of energy limits of the batteries, power limits of the batteries, and power limits of the power grid.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 illustrates a hardware description of the computer according to one example;

FIG. 10 is a flowchart for a first method of improving energy resource distribution according to one example.

DETAILED DESCRIPTION

Figure 1A:
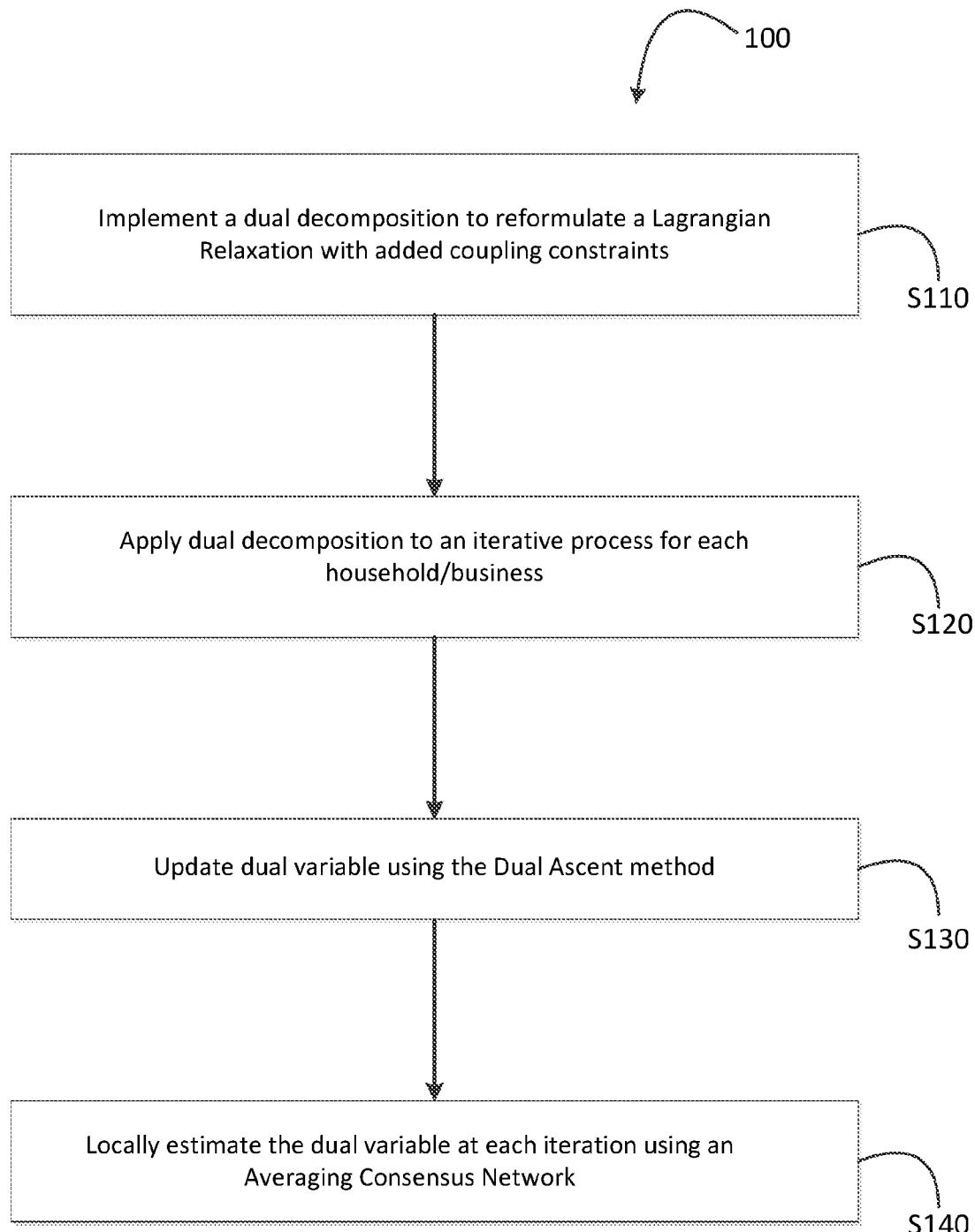
FIG. 1A is a flowchart illustrating the cooperative distributed aggregation algorithm according to one example.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in this specification, but rather is defined by the claims.

It will be appreciated that in the development of any such actual implementation, numerous implementation-specific decisions need to be made in order to achieve the developer's specific goals, such as compliance with application- and business-related constraints, and that these specific goals will vary from one implementation to another and from one developer to another.

A cooperative distributed aggregation is formulated herein using Distributed Energy Storage Devices (DESDs) and a synchronization of energy loads between entities, such as households or businesses. In one aspect of embodiments described herein, a storage device such as a battery is described to formulate a system, method, and algorithm of a cooperative distributed aggregation of energy storage sources. In a second aspect of embodiments described herein, a system, method, and algorithm for a cooperative distributed strategy is described for the synchronization of an energy load between entities, via an HVAC unit of each entity.

In the first aspect using DESDs, certain control actions and/or dispatch commands affect the degradation of a storage battery. Some primary factors that affect the battery degradation include a high operational temperature, a high C-rate, extreme State of Charge (SoC) levels, and a high Depth of Discharge. See J. Vetter, P. Novak, M. R. Wagner, C. Veit, K. C. Möller, J. O. Besenhard, M. Winter, M. Wohlfahrt-Mehrens, C. Vogler, and A. Hammouche, "Ageing mechanisms in lithium-ion batteries," J Power Sources, vol. 147, no. 1-2, pp. 269-281,2005, incorporated herein by reference in its entirety. The capacity degradation model proposed in Fortenbacher et al. is used herein because it captures most of these capacity-fading factors. See P. Fortenbacher, J. L. Mathieu, and G. Andersson, "Modeling, identification, and optimal control of batteries for power system applications," 2014 Power Syst. Comput. Conf., pp. 1-7,2014, incorporated herein by reference in its entirety.

The first term of the model in equation (1) accounts for the degradation due to the SoC deviation from a nominal SoC where the degradation is minimum. Usually the nominal SoC is close to 50%. The other terms in equation (1) account for the degradation due to the charging and discharging C-rate with both linear and quadratic components. Equation (1) is a convex function that does not add additional complexity to the optimization problem.

$$\Delta Q(t) = a^i \cdot (SoC(t) - b^i)^2 + \tag{1}$$
$$c^i \cdot P_{charge}(t) + d^i \cdot P_{discharge}(t) + e^i \cdot P_{charge}^2 + f^i \cdot P_{discharge}^2$$

In order to consider the capacity degradation into the optimization problem described herein, equation (1) is mapped into a battery degradation cost function using the following linear value depreciation function. $C_{replace}$ is the replacement cost of the battery, $Q_0$ is the initial capacity, and $Q_{replace}$ is the capacity at which the battery is replaced.

$$J_{deg,i}(t) = \frac{C_{replace}}{Q_0 - Q_{replace}} \Delta Q(t) \tag{2}$$

Since the ISO procures most of its capacity resources in a Day-Ahead Wholesale Market, the DR problem is formulated as a 24-hour ahead scheduling problem. One objective is to minimize the total operating cost of the entire system (i.e. aggregated households) while satisfying constraints over the time horizon T. The operating cost of the entire system includes the aggregated daily household energy bill from the utility, the battery degradation cost, and the revenue of providing a DR service.

$$\min_{x \in C} \sum_{t=1}^{T} \sum_{i \in N} (J_{energy,i}(t) + J_{deg,i}(t)) - J_{DR} \tag{3}$$

where $x = U_{i \in N} x_i$ is the set of the decision variables for all the households, and C is the set of constraints. Each term in equation (3) is described as:

Energy Bill is the cost of buying electricity from the local utility. $p_{buy,i}(t)$ and $p_{sell,i}(t)$ are the buying and selling prices, respectively.

$$J_{energy,i}(t) = P_{buy,i}(t) \cdot P_{import,i}(t) \cdot \Delta t$$
$$-P_{sell,i}(t) \cdot P_{export,i}(t) \cdot \Delta t \tag{4}$$

Battery Degradation Cost is derived based on equation (1) and equation (2).

$$J_{deg,i}(t) = a_i \cdot (SoC_i(t) - b_i)^2 + \tag{5}$$
$$c^i \cdot P_{charge,i}(t) + d_i \cdot P_{discharge,i}(t) + e_i \cdot P_{charge,i}^2 + f_i \cdot P_{discharge,i}^2$$

where $SoC_i(t) = E_i(t)/Q_T$, $Q_T$ is the battery capacity, and $E_i(t)$ is the energy stored as defined in equation (6).

$$E_i(t) = E_{init,i} + \sum_{z=1}^{t} P_{charge,i}(s) \cdot \eta_i \cdot \Delta t - \sum_{t=1}^{t} (P_{discharge}(s)) \cdot \frac{\Delta t}{\eta_i} \tag{6}$$

DR Capacity Revenue is the benefit from providing a DR service and it depends on the power offered by the aggregator ($P_{curtail}$) wherein PDR is the capacity price in $/kW.

$$I_{DR} = P_{DR} \cdot P_{Curtail} \tag{7}$$

Constraints for the optimization problem can be divided into two categories of local constraints and global constraints. The local constraints refer to those that only affect each household independently. The global constraints couple variables from each household or business entity, preventing the optimization problem from being solved by each entity independently.

The set of local constraints $c_i = U_{i \in N} C_i$ are:

Power Balance of each Entity. It ensures the power balance in each household or business among the grid power ($P_{import,i}$ and $P_{export,i}$), battery charge/discharge power, uncontrollable demand ($P_{dem,i}$), and nondispatchable PV generation ($P_{gen,i}$).

$$\begin{array}{c} P_{import,i}(t) - P_{export,i}(t) + \\ \forall i \in N \quad P_{discharge,i}(t) - P_{charge,i}(t) = \\ \forall t \in [1, T] \quad P_{dem,i}(t) - P_{gen,i}(t) \end{array} \tag{8}$$

Energy Limits of the Battery. It ensures that the energy stored in each battery is within its capacity limits.

$$\forall t \in N \quad (9)$$
$$E_{min,i} \leq E_i(t) \leq E_{max,i}$$
$$\forall t \in [1, T]$$

Power Limits of the Battery: It ensures that the charging and discharging power is within its safety limits.

$$\forall t \in N \quad 0 \leq P_{charge,i}(t) \leq p_{charge,i}^{max} \quad (10)$$
$$\forall t \in [1, T] \quad 0 \leq P_{discharge,i}(t) \leq p_{discharge,i}^{max}$$

Grid Power Limits: To ensure that the import and export power is within the local utility limits.

$$\forall t \in N \quad 0 \leq P_{import,i}(t) \leq p_{import,i}^{max} \quad (11)$$
$$\forall t \in [1, T] \quad 0 \leq P_{export,i}(t) \leq p_{export,i}^{max}$$

In order to satisfy the DR service that goes from peak-hours $t_a$ to $t_b$, the net amount of power imported by the households or businesses must be reduced based on the capacity commitment offered by the aggregator to the ISO, $P_{curtail}(t)$. As discussed herein, the baseline, $P_{Baseline,i}$, is the power that would be imported from the power grid by household/business i if there was no DR event. For convenience in latter derivations, the constant vector $P_{imp}^{max}(t)$ is used to express the maximum amount of power that can be drawn from the power grid in order to satisfy the DR service. Therefore, for all $t \in [t_a, t_b]$, the global constraints are defined as:

$$\sum_{i \in X}(P_{import,i}(t) - P_{export,i}(t)) - p_{imp}^{max}(t) \leq 0 \quad (12)$$

where, $$p_{imp}^{max}(t) = \sum_{i \in N}(P_{Baseline,i}(t)) - P_{Curtail}(t) \quad (13)$$

In baseline considerations and calculations, the DR provider is paid based on how much load it is able to curtail at a given period of time. However, this requires comparing the load consumption of a household when there is a DR event with the power a household would have consumed if there was no DR event. The latter amount is called the household load baseline and each ISO follows its own rule to calculate it. As described herein, the baseline for each household is calculated by solving the optimization problem of equation (3) without the DR term and considering constraints in equations (8-11), for each household independently.

The derivation of a cooperative distributed aggregation algorithm is described herein, which is fully distributed and considers each household/business as an independent agent. The Dual Decomposition (DD) method is applied first to divide the problem into a set of low-dimension sub-problems that can be solved locally by each independent agent. However, these sub-problems still depend on some global system variables. To fully distribute the algorithm, an Averaging Consensus Network (ACN) is used to estimate the global system variables using only local available information.

FIG. 1A is a flowchart illustrating the cooperative distributed aggregation algorithm 100. In step S110, implementation of a dual decomposition in which the original optimization problem is reformulated using the Lagrangian Relaxation, and adding the coupling constraints $g(t) \leq 0$ in equation (12) to the objective in equation (3) with the dual variables $\mu(t)$.

A dual variable is a variable associated with a dual problem. A convex optimization problem can include a minimized function over a variable, referred to as a primal variable. The convex optimization problem can be transformed into an equivalent maximization problem over another variable, referred to as a dual variable. The transformation can help to derive a distributed optimization problem. For example, the dual variable can represent a price to violate a global constraint that fixes the demand response level. The dual variable also includes mathematically encrypted global information, which is the same for all houses/businesses. Therefore, the new optimization problem becomes:

$$\max_{\mu \geq 0}\left(\min_{x \in C_i} L(x, \mu)\right) \quad (14)$$

where, $$L(x, \mu) = \sum_{i \in N}\sum_{i=1}^{T} J_i(t) + \sum_{i=i_a}^{i_b} \mu(t) \cdot g(t) \quad (15)$$

In step S120, the DD method is applied to derive the following iterative process. See S. Boyd, L. Xiao, A. Mutapcic, and J. Mattingley, "Notes on Decomposition Methods," Notes, vol. D, no. 2006, pp. 1-36, 2007, incorporated herein by reference in its entirety. First, at each iteration k, each household/business i solves, given $\mu^k(t)$, the local optimization problem:

$$x_i^R = \arg\min_{x_i \in C_i}\left(\sum_{i=1}^{T} J_i(t) + \sum_{t=t_a}^{t_b} \mu^k(t) \cdot \Delta P_i^k(t)\right) \quad (16)$$

where, $$\Delta P_i^k(t) = P_{import_i}(t) - P_{export_i}(t) - \frac{p_{imp}^{max}(t)}{N} \quad (17)$$

The first term in equation (16) can be considered as the goal of each household to optimize its own utility. The second term can be interpreted as the cooperation among households to provide a DR service in the aggregated level.

In step S130, the dual variable is updated using the Dual Ascent method:

$$\mu^{k+1}(t) = \mu^k(t) + a_k \cdot \frac{\partial L}{\partial \mu(t)}(x^k, \mu^k(t)) \quad (18)$$

where, $$\frac{\partial L}{\partial \mu(t)}(x^k, \mu^k(t)) = \sum_{i \in N}(P_{import,i}^k(t) - P_{export,i}^k(t)) - p_{imp}^{max}(t) \quad (19)$$

The update rule of equation (18) for $\mu^k(t)$ requires each household/business to know all the other household/business power exchanges with the power grid. Therefore, there needs to be a central controller or coordinator with access to this information. See S. J. Kim and G. B. Giannakis, "Scalable and robust demand response with mixed-integer constraints," IEEE Trans. Smart Grid, vol. 4, no. 4, pp. 2089-2099, 2013; S. Mhanna, A. C. Chapman and G. Verbic, "A Distributed Algorithm for Large-Scale Demand Response Aggregation," IEEE Trans. Smart Grid, pp. 1-8, 2015; C. Le Floch, F. Belletti, and S. Moura, "Optimal Charging of Electric Vehicles for Load Shaping: a Dual Splitting Framework with Explicit Convergence Bounds," IEEE Trans. Transp. Electrif., vol. 7782, no. c, pp. 1-9, 2016, each incorporated herein by reference in its entirety. Thus, this update rule is still subject to the drawbacks, such as single-point of failure in the coordinator and disclosure of private household information to each other.

In step S140, an Averaging Consensus Network is used to avoid a central coordinator and to locally estimate $\mu^k(t)$. See R. Olfati-Saber, J. A. Fax, and R. M. Murray, "Consensus and cooperation in networked multi-agent systems," Proc. IEEE, vol. 95, no. 1, pp. 215-233, 2007, incorporated herein by reference in its entirety. For example, given for illustrative purposes only, each house/business can calculate an optimal battery charge profile and/or an optimal HVAC usage profile if the correct values of the dual variables are known. Since this is not initially known, an iterative process is followed to determine the dual variables. A gradient ascent method can be used to find the dual variables. A gradient ascent method is a technique used in optimization problems to find an optimal solution, which is based on the gradient. However, in order to calculate the gradient (which is unique for all houses/businesses), knowledge is needed about each house/business. To overcome this, an approximation of the gradient is based on local information, which uses a consensus network, such as an Averaging Consensus Network to create an improved approximation through each iteration. Therefore, each house/business can reach a consensus and obtain a closer estimation of the dual variables.

Given a connected communication topology among the households/businesses, each entity i only needs their neighbors' estimations to update its local estimation of the dual variable, $\hat{\mu}_i^k(t)$.

$$\hat{\mu}_i^{k+1}(t) = \hat{\mu}_i^k(t) + \sum_{j \in N_i} w_{ij}\left(\hat{\mu}_j^k(t) - \hat{\mu}_i^k(t)\right) + d^k \cdot \widehat{\Delta p}_i^k(t) \qquad (20)$$

The gradient used to update $\hat{\mu}_i^k(t)$ is also updated using only local information.

$$\widehat{\Delta p}_i^{k+1}(t) = \widehat{\Delta p}_i^k(t) + \sum_{j \in N_i} w_{ij}\left(\widehat{\Delta p}_j^k(t) - \widehat{\Delta p}_i^k(t)\right) \qquad (21)$$

$$\Delta p_i^{k+1}(t) - \Delta p_i^k(t)$$

Figure 2A:
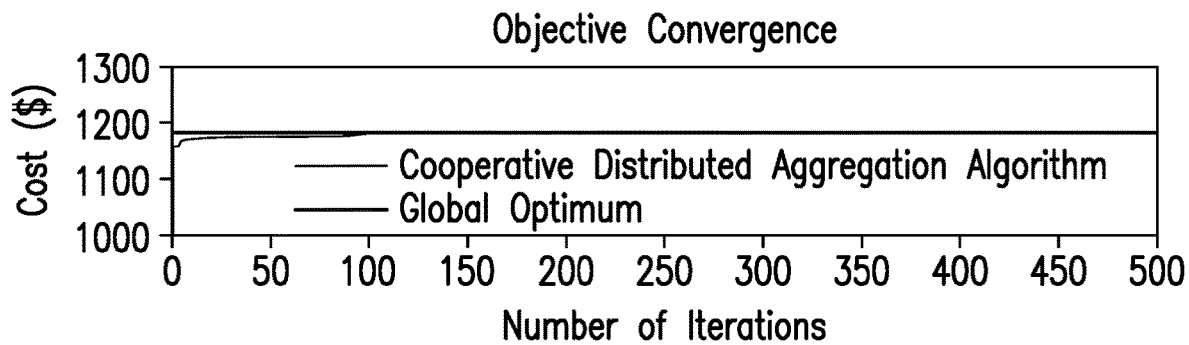
FIG. 2A is a graph illustrating the convergence of the objective function to the global optimal value according to one example.

Each house/business performs an update based on equation 20 and 21, then shares those values with its immediate neighbor to continue the iterative process until all of the houses/businesses reach a consensus for the values in equations 20 and 21. The consensus network allows a number of houses/businesses to reach an agreement on a value for the dual variable and the gradient by sharing the individual dual variables iteratively with each other. FIG. 2A illustrates a convergence of values in equations 20 and 21 when each house/business has reached a consensus. Each house/business is updating every iteration until each house/business reaches a consensus. In an example, 200 iterations are made to find an optimum strategy for a group of houses/businesses in an aggregated distribution system.

Each controller within the houses/businesses are connected through a network communication. When each controller performs an iteration, it transmits those values through the communication network to its closest neighboring house/business. If the Internet is used as the communication network, the data is routed via a protocol, such as TCP protocol. Therefore, the algorithm above becomes fully distributed. As used herein, a "neighbor" can refer to a single house or business, a single appliance, a community of houses/businesses, or a node within a network.

Furthermore, it can be observed that each household/business does not share any private power data with its neighbors—only its local estimation of the dual variables. Thus, the algorithm also ensures that the household/business private information is preserved. In addition, if some agents fail, the DR service can still be provided by the other households/businesses after a reconfiguration. Therefore, the described algorithm is also robust to single-point-of-failure.

Figure 1B:
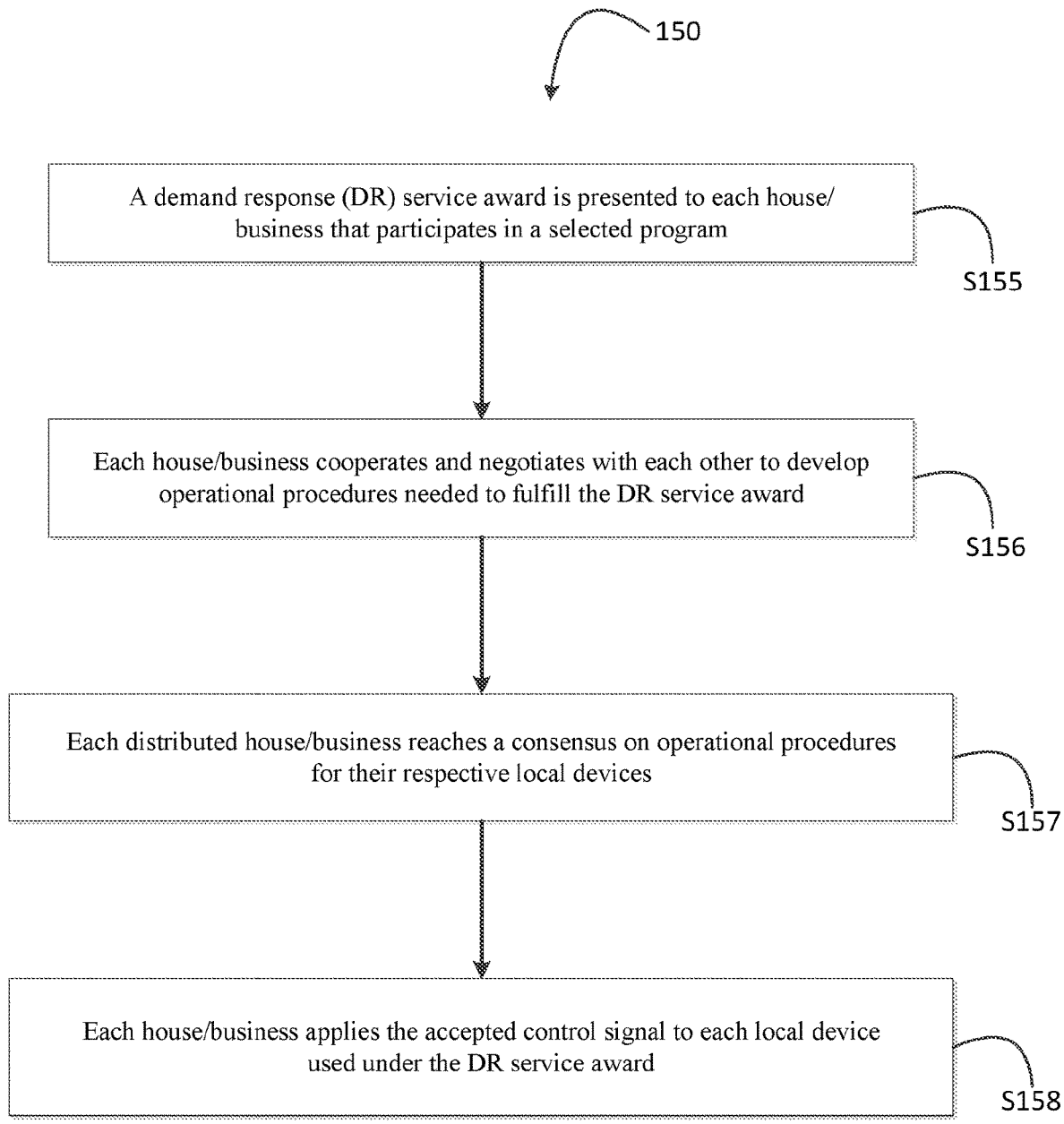
FIG. 1B is a flowchart for an exemplary aggregator application of the cooperative distributed aggregation algorithm according to one example.

FIG. 1B is a flowchart for an exemplary aggregator application 150 of the cooperative distributed aggregation algorithm 100, which can be used to provide services to an energy grid. In an example given for illustrative purposes only, an aggregator can bid into an ISO DR capacity market. When a DR contract is given by the ISO to the aggregator for a set of houses or businesses, the houses/businesses determine a consensus by which to optimally fulfill the service contract. The power grid does not interfere with the aggregator during the iterative consensus process of algorithm 1.

In step S155, a demand response (DR) service award is presented to each house/business that participates in a selected program. For example, the selected program can be the result of an ISO broadcast.

In step S156, each house/business cooperates and negotiates with each other to develop operational procedures needed to fulfill the DR service award. Details include operational procedures for each house/business battery, HVAC, etc. device(s).

In step S157, each distributed house/business reaches a consensus on operational procedures for their respective local devices. The control signal is determined by which the respective local devices will be operated.

In step S158, each house/business applies the accepted control signal to each local device used under the DR service award. Each house/business can include more than one local device, which includes but is not limited to battery storage devices, HVAC units, water heaters or water boilers, heat pumps, and electrical heating systems.

Figure 1C:
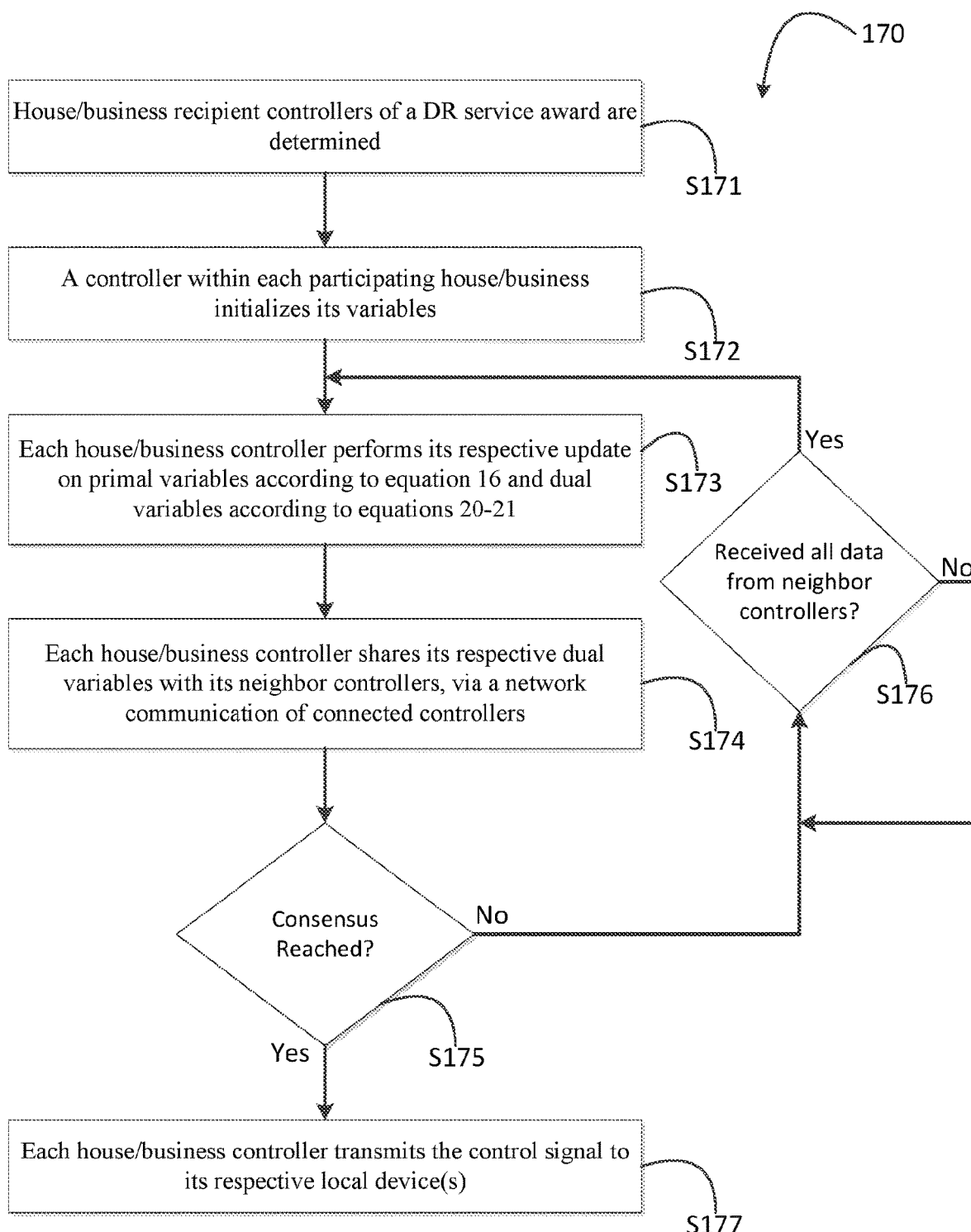
FIG. 1C is a flowchart for an exemplary controller application of the cooperative distributed aggregation algorithm according to one example.

FIG. 1C is a flowchart for an exemplary controller application 170 of the cooperative distributed aggregation algorithm 100. In step S171, house/business recipient controllers of a DR service award are determined. This can be in response to an invitation or offer from an ISO to participate as a distributed energy resource.

In step S172, a controller within each participating house/business initializes its variables. The goal of each household is to optimize its own utility. The cooperation among households provides a DR service at an aggregated level.

In step S173, each house/business controller performs its respective update on primal variables according to equation 16 and dual variables according to equations 20-21.

In step S174, each house/business controller shares its respective dual variables with its neighbor controllers, via a network communication of connected controllers. After each controller performs an iteration, it forwards the data through the communication network to respective neighboring controllers.

In step S175, it is determined whether a consensus of neighboring controllers within the distributed aggregation has been reached. If a consensus has not been reached (a "NO" decision in step S175), it is determined whether each affected house/business controller has received data from its respective neighboring controllers in step S176. If some data has not been received (a "NO" decision in step S176), the process holds until data has been received from all applicable neighboring controllers. If all data has been received (a "YES" decision in step S176), the process returns to step S173.

If a consensus has been reached in step S175 (a "YES" decision in step S175), the process proceeds to step S177. In step S177, each house/business controller transmits the control signal to its respective local device(s). When a consensus has been reached amongst the houses/business, the respective controllers set the control signal for each local device(s). For example, the battery controller can determine how much battery power to discharge or charge at a given moment. In another example, the HVAC controller can determine a thermostat temperature setpoint in order to minimize the energy cost and/or discomfort.

From a perspective of the energy grid, the grid only sees one aggregated system of N houses/businesses fulfilling an agreed-upon service. From each house/business perspective, each house/business collaborates with other houses/businesses without the need of a centralized controller. The houses/businesses can provide the energy measuring data to the ISO via a selected house/business. The house/business can be selected based upon parameters, such as the house/business with better communication capability, the house/business closest to a substation, or the house/business having the best previous DR performance score. However, other parameters are contemplated by embodiments described herein. If the controller is implemented in a cloud datacenter, the energy device of each house/business has a connection to the cloud datacenter through the Internet.

Numerical simulations are given herein to demonstrate the effectiveness of the algorithm introduced above. The algorithm is applied to a 200-household aggregation case, where the convergence of the algorithm to the global optimum is validated. A cost-benefit analysis is presented to show the economic benefit of providing DR services, for both the entire system as well as for each individual household/business. The scalability of this algorithm was studied in terms of computational burden.

Simulation parameters for each household/business entity are listed in Table I. As described herein, the sell-back-to-grid price is considered to be zero. Regarding the DR service, the event goes from 4 PM to 8 PM, and the ISO pays 2$/kW of curtailed load in a day with a DR event. Despite the total system capacity being $p_{disch\ arg\ e,i}^{max} \cdot N$, each battery also has to support the local demand. Therefore, the DR capacity provided by the aggregated system to the power grid is set to 20% of the total capacity.

TABLE I

HOUSEHOLD PARAMETERS

| Energy Storage | | Utility Tariff |
|---|---|---|
| Tesla Powerwall: | Degradation: | Time-of-Use: |
| Power Max: 3.3 kW | $a_i = 0.01$ | Peak: 4 pm-9 pm |
| Capacity: 6.4 kW | $b_i = 0.45$ | 35 ¢$/kWh |
| Efficiency: 93% | $c_i = d_i = 0.04$ | Off-Peak: |
| SoC: 10%-90% | $e_i = f_i = 0.01$ | 2.5 ¢$/kWh |

Figure 2B:
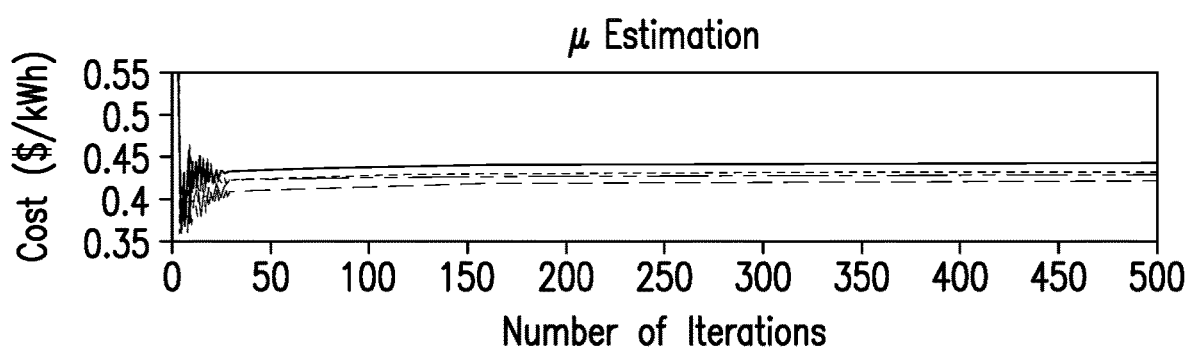
FIG. 2B is a graph illustrating the convergence of each local estimation of a dual variable to the optimal value according to one example.

The convergence to the global optimum of the algorithm for a 200-household aggregation case is illustrated in FIGS. 2A-2B. FIG. 2A is a graph illustrating the convergence of the objective function to the global optimal value. FIG. 2B is a graph illustrating the convergence of each local estimation of the dual variable, $\hat{\mu}_i^k(t)$, to the actual global value.

Figure 3A:
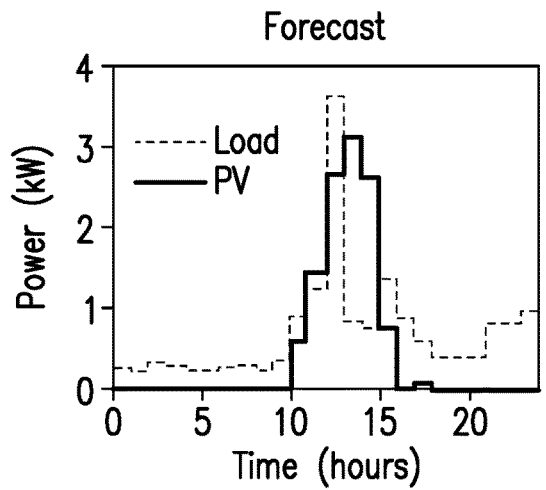
FIG. 3A is a graph illustrating the load and the PV generation forecast for a typical household/business according to one example.
Figure 3B:
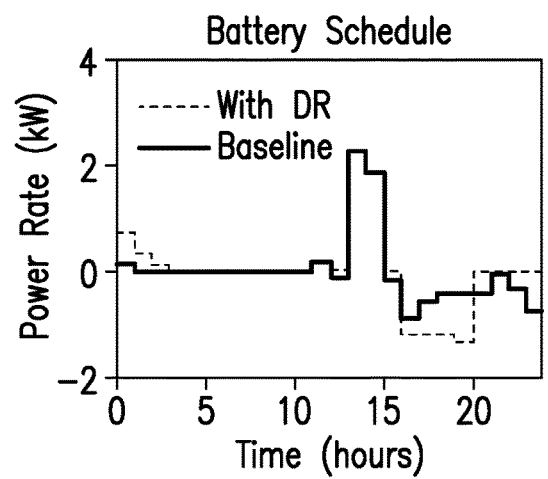
FIG. 3B is a graph illustrating the battery dispatch schedule according to one example.
Figure 3C:
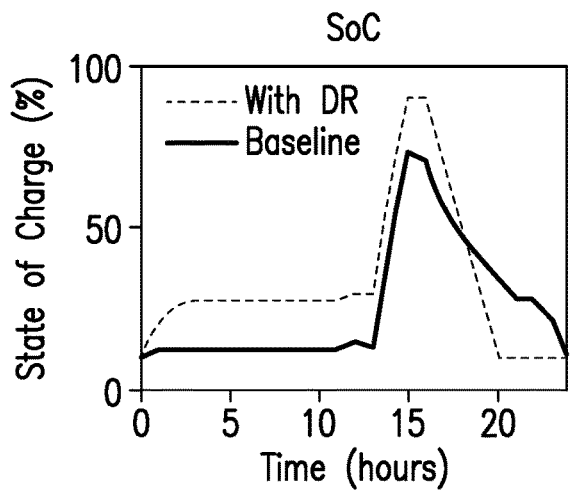
FIG. 3C is a graph illustrating the SoC of the battery according to one example.
Figure 3D:
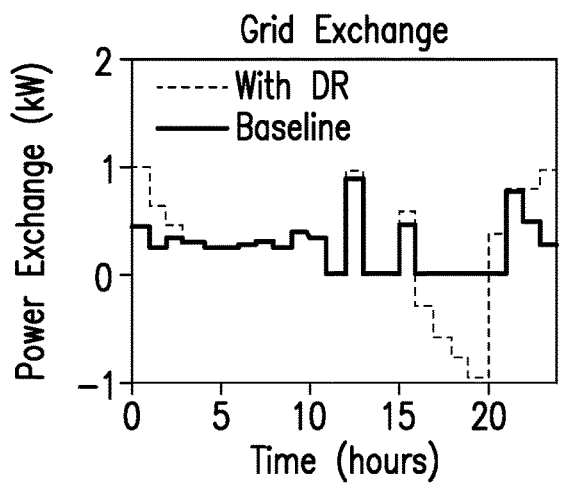
FIG. 3D is a graph illustrating the power exchange with the grid according to one example.

A representative household operation shown in FIGS. 3A-3D illustrates how one individual household behaves. FIG. 3A is a graph illustrating the load and the PV generation forecast for the household/business. FIGS. 3B-3D are graphs illustrating the comparison between the baseline for that household/business and the actual operation in a day with a DR event. FIG. 3B is a graph illustrating the battery dispatch schedule. FIG. 3C is a graph illustrating the SoC of the battery. These graphs illustrate how the battery is mostly discharged during the DR period (4 to 8 pm) and also, the higher amount of energy throughput of the battery in the DR case compared with the baseline. As shown in Table II below, this induces more degradation in the battery, but the extra cost is appropriately compensated by the ISO. FIG. 3D is a graph illustrating the power exchange with the grid. It can be observed that in the DR scenario, the battery is injecting power to the power grid.

A cost-benefit analysis comparing with and without DR participation is presented herein. A cost, such as an operational cost or a degradation cost can be expressed as a general optimization parameter, which takes technical functioning parameters, such as degradation, power or current flow, etc. into account. A revenue can be defined as a negative cost in a similar manner. The total system costs for both cases are shown in Table II.

TABLE II

200-HOUSEHOLD SYSTEM COST

| Cost | Without DR Participation | With DR Participation |
|---|---|---|
| Utility Bill | $1322.54 | $1336.57 |
| Degradation Cost | $67.84 | $111.60 |
| Capacity Payment | $0.00 | −$264.00 |
| Total | $1390.38 | $1184.17 |

Despite the operational cost increases when the system participates in the DR program, the benefit associated with the participation makes its total cost lower, as illustrated in Table II. To demonstrate the benefit for each individual household/business for participating in the aggregation, the total DR capacity payment is divided among the households/businesses in a proportional manner, depending on the amount of load curtailed by each household/business. The individual household/business benefit is defined as the difference between the cost during a DR event and a normal day.

Figure 4A:
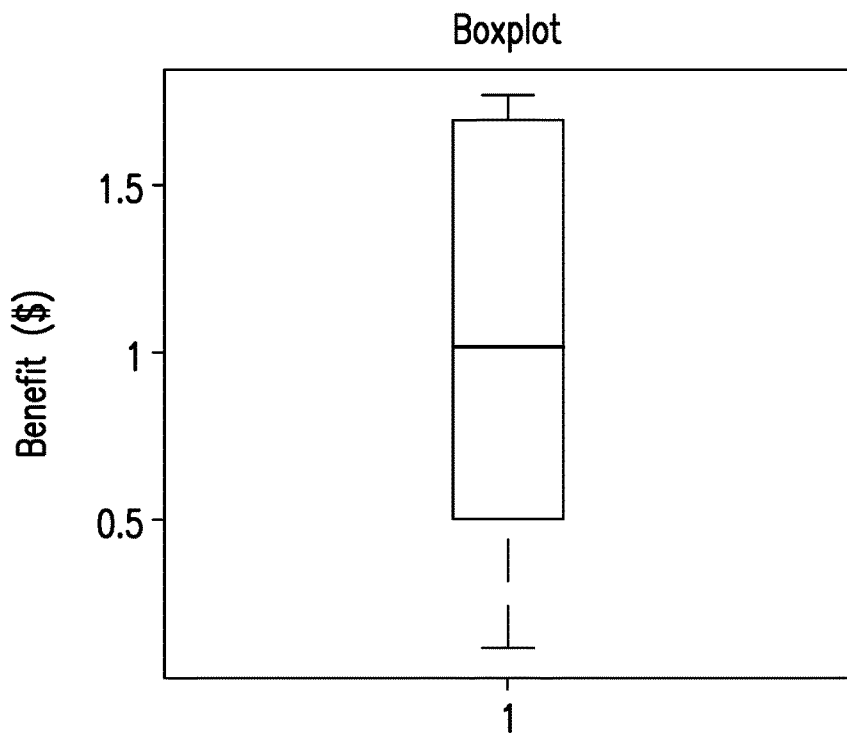
FIG. 4A is a boxplot illustrating the distribution of the economic benefit for each household/business according to one example.
Figure 4B:
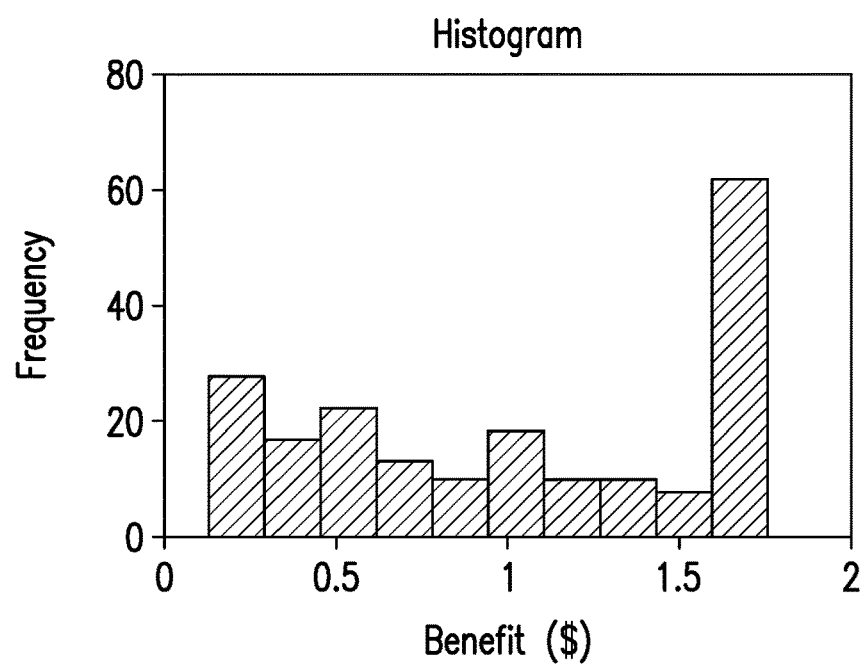
FIG. 4B is a histogram illustrating the distribution of the economic benefit for each household/business according to one example.

FIG. 4A is a boxplot illustrating the distribution of the economic benefit for each household/business. FIG. 4B is a histogram illustrating the distribution of the economic benefit for each household/business. FIGS. 4A and 4B illustrate that both household/business entities get some benefit by participating in the DR program.

A computation performance comparison is presented in Table III to demonstrate how the proposed algorithm outperforms other centralized approaches in terms of scalability. The first centralized approach directly solves equation (3-11) while the second centralized approach solves the problem using the decomposition technique in equation (16-19). For the proposed distributed algorithm, a fully connected mesh network is selected as the communication topology for this study. The algorithm is considered to be converged when the constraint violation error for (12) is lower than $\epsilon = 0.5$.

All the simulations were performed using a PC with a CORE® processor from Intel Corporation of America @ 3.40 GHz processor, and 16.0 GB of RAM. MATLAB® was used as the simulation environment. The YALMIP® Toolbox was used to code the optimization problems, and CPLEX® was used as the optimization solver.

TABLE III

ALGORITHM SCALABILITY

| Households | Distributed Approach | | Centralized Approach I | Centralized Approach II | |
|---|---|---|---|---|---|
| | Iter. | Time(s) | Time (s) | Iter. | Time (s) |
| 50 | 104 | 1.6 | 1.4 | 80 | 128 |
| 250 | 152 | 2.4 | 34.8 | 83 | 332 |
| 500 | 301 | 4.8 | 3,562.6 | 85 | 680 |
| 750 | 439 | 7.0 | — | 84 | 1.008 |
| 1000 | 569 | 9.1 | — | 84 | 1.344 |

The distributed algorithm described herein for day-ahead scheduling of a large fleet of DESDs to provide DR during peak hours to the power grid has several advantages. It enables a small-sized DESD to participate in a major power grid environment, such as the Wholesale Markets through aggregation to create new revenue streams for the DESD owners. The algorithm also takes into account how the batteries degrade to maximize their life-span. In addition, the algorithm achieves a global optimal solution without a centralized coordinator. It is also scalable to a large number of household/business entities, it is robust against a single-point-of-failure, and it preserves individual household/business information.

In the second aspect, a system, method, and algorithm for a cooperative distributed strategy are described for the synchronization of an energy load between entities, via an HVAC unit of each entity. An optimization of the second aspect is formulated to decide a temperature set point at each moment for each household/business entity's thermostat in order to fulfill a DR commitment. The problem is formulated as a multi-objective optimization problem, considering the tradeoff between an energy bill (related to the energy consumption) and the occupants' comfort inside the household/business.

An objective is to minimize the weighted sum of the energy bill and the discomfort as follows. For simplicity, the HVAC unit is considered to work in the cooling mode. Expanding the algorithm to work in the heating mode can be accomplished by modifying some terms in the formulation.

$$\min_{y}(w_1 \cdot J_{bill} + w_2 \cdot J_{discomfort})$$

$$J_{bill} = \sum_{t=1}^{T}\sum_{i \in N}(p_{buy}(t) \cdot \Delta t \cdot P_{HVAC,i} \cdot x_{cool,i}(t))$$

$$J_{discomfort} = \sum_{t=1}^{T}\sum_{i \in N}\left(T_i^{sp,DR}(t) - T_i^{SP,baseline}(t)\right)^2$$

$J_{discomfort}$ penalizes modifying the temperature set point during a DR event ($T_i^{sP,DR}$) with respect to a typical temperature set point that would have occurred on a normal day ($T_i^{SP,baseline}$).

y is the set of decision variables $$Y = \{x_{cool,i}(t), T_i^{sp,DR}(t) T_i^{in}(t), S(t), D(t), z(t)\}$$

Figure 5:
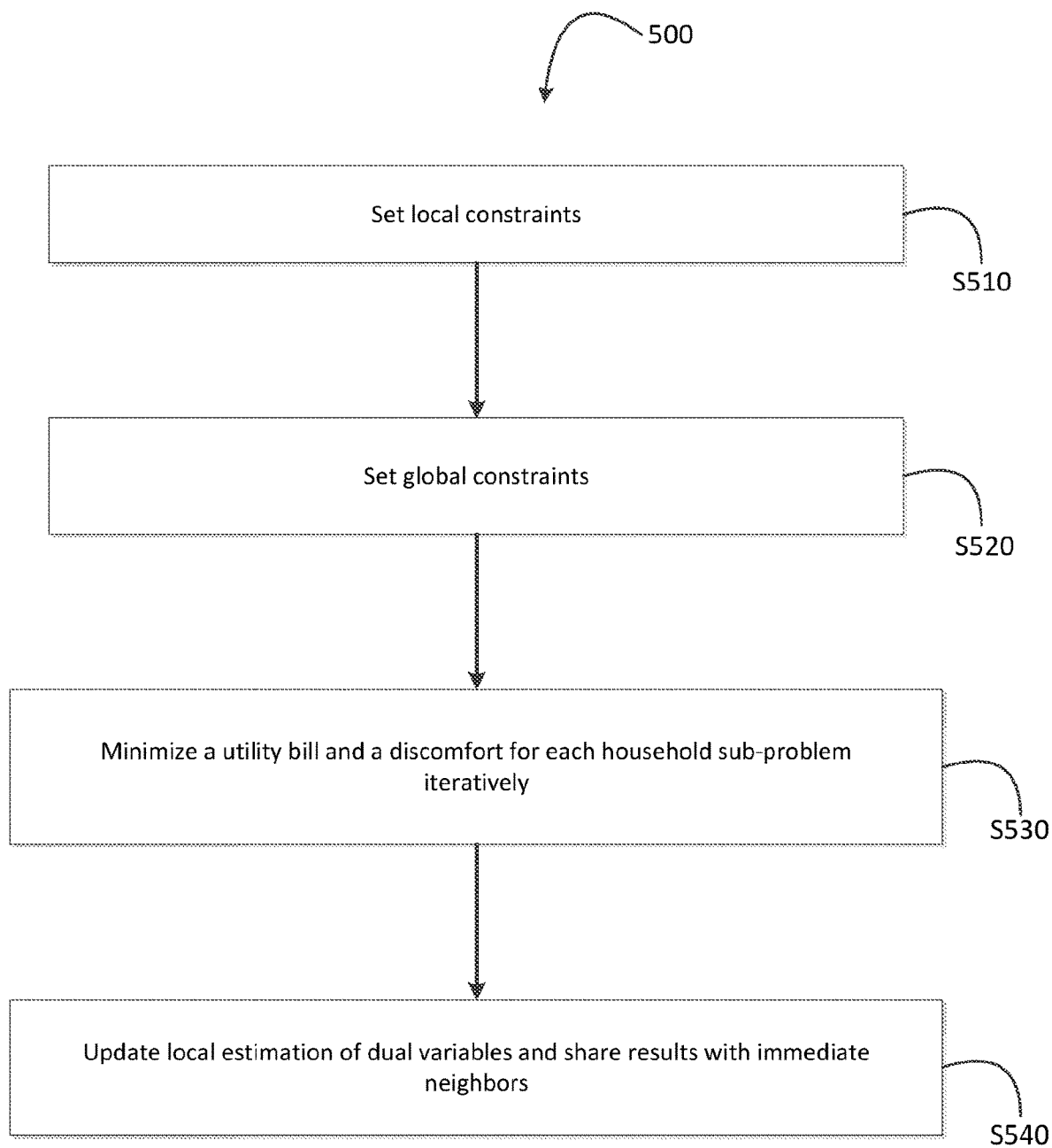
FIG. 5 is a flowchart of an algorithm to determine an operational status profile of temperature set points for each thermostat according to one example.

FIG. 5 is a flowchart of an algorithm 500 to determine an operational status profile of temperature set points for each thermostat to fulfill the DR commitment. A set of constraints can be classified into a set of local constraints and a set of global constraints. The local constraints refer to those that only affect each household/business independently. The global constraints couple variables from each household/business, preventing the optimization problem from being solved by each household/business independently.

In step S510, the set of local constraints, $U_{i \in N} C_i$, are set. The following models can be used.

Thermal model. It calculates the evolution of the temperature inside each household/business.

$$T_i^{in}(t+1) = e^{-\frac{\Delta t}{R \cdot C}} \cdot T_i^{in}(t) + \left(1 - e^{-\frac{\Delta t}{R \cdot C}}\right) \cdot T_i^{out}(t) + Q \cdot R \cdot \left(1 - e^{-\frac{\Delta t}{R \cdot C}}\right) \cdot x_{cool,i}(t)$$

Dead-band Control Model for HVAC
1. Transition variables:

$$x_{cool,i}(t) = x_{cool,i}(t-1) + S(t) - D(t)$$

$$S(t) = \{0,1\}$$

$$D(t) = \{0,1\}$$

S(t): indicates the transition of the HVAC from Off to On.
D (t): indicates the transition of the HVAC from On to Off.
2. Force AC to turn on after the temperature is above a limit:

$$T_i^{in}(t) - \left(T_i^{sp,DR} + \frac{\Delta T_{db,i}}{2}\right) \le M \cdot S(t)$$

3. Force AC to not turn on until the temperature is above the limit:

$$T_i^{in}(t) - \left(T_i^{sp,DR} + \frac{\Delta T_{db,i}}{2}\right) \ge M \cdot (S(t) - 1)$$

4. Force AC to turn off after the temperature is below the limit:

$$T_i^{in}(t) - \left(T_i^{sp,DR} - \frac{\Delta T_{db,i}}{2}\right) \le M \cdot (1 - D(t))$$

5. Force AC to not turn off until the temperature is below the limit:

$$T_i^{in}(t) - \left(T_i^{sp,DR} - \frac{\Delta T_{db,i}}{2}\right) \geq -M \cdot D(t)$$

The dead-band control of an HVAC unit is formulated as the following non-linear expression.

$$x_{cool,i}(t) = \begin{cases} x_{cool,i}(t-1), & T_i^{sp,DR}(t) - \frac{\Delta T_{db,i}}{2} \leq T_i^{in}(t) \leq T_i^{sp,DR}(t) + \frac{\Delta T_{db,i}}{2} \\ 0, & T_i^{in}(t) < T_i^{sp,DR}(t) - \frac{\Delta T_{db,i}}{2} \\ 1, & T_i^{in}(t) > T_i^{sp,DR}(t) + \frac{\Delta T_{db,i}}{2} \end{cases}$$

The HVAC only changes its state, $x_{cool,i}(t)$, when the temperature inside the household/business goes above or below the high and low limits, respectively. These limits are set by the Dead-band ($\Delta T_{db,i}$) and the temperature set point ($T_i^{sp,DR}(t)$).

However, this "if-then" formulation cannot be included into a Mixed-Integer Linear Program because of the non-linearity of the expressions. Therefore, the previous expression is transformed into the following set of MILP constraints.

First Transformation:
The previous model is decomposed into one equality constraint and two "if-then" simpler models by introducing two new binary variables:

$x_{cool,i}(t) = x_{cool,i}(t-1) + S(t) - D(t)$ $S(t) = \{0,1\}$ $D(t) = \{0,1\}$ S(t): will be 1 in the transition of the HVAC from Off to On.
D(t): will be 1 in the transition of the HVAC from On to Off.

$$S(t) = \begin{cases} 1, & T_i^{in}(t) > \left(T_i^{sp,DR}(t) + \frac{\Delta T_{db,i}}{2}\right) \\ 0, & \text{otherwise} \end{cases}$$

$$D(t) = \begin{cases} 1, & T_i^{in}(t) < \left(T_i^{sp,DR}(t) - \frac{\Delta T_{db,i}}{2}\right) \\ 0, & \text{otherwise} \end{cases}$$

However, the simpler model is still an "if-then" model and needs further transformations.

Second Transformation:
The simpler model is transformed $$S(t) = \begin{cases} 1, & T_i^{in}(t) \geq \left(T_i^{sp,DR}(t) + \frac{\Delta T_{db,i}}{2}\right) \\ 0, & \text{otherwise} \end{cases}$$

into the following two constraints using the Big-M approach:

Force $S(t) = 1$ when $T_i^{in}(t) > \left(T_i^{sp,DR}(t) + \frac{\Delta T_{db,i}}{2}\right)$:

$$T_i^{in}(t) - \left(T_i^{sp,DR} + \frac{\Delta T_{db,i}}{2}\right) \leq M \cdot S(t)$$

Force $S(t) = 0$ when $T_i^{in}(t) < \left(T_i^{sp,DR}(t) + \frac{\Delta T_{db,i}}{2}\right)$:

$$T_i^{in}(t) - \left(T_i^{sp,DR} + \frac{\Delta T_{db,i}}{2}\right) \geq M \cdot (S(t) - 1)$$

Third Transformation:
The previous model is further transformed $$D(t) = \begin{cases} 1, & T_i^{in}(t) \leq \left(T_i^{sp,DR}(t) - \frac{\Delta T_{db,i}}{2}\right) \\ 0, & \text{otherwise} \end{cases}$$

into the following two constraints using the Big-M approach:

Force $D(t) = 1$ when $T_i^{in}(t) < \left(T_i^{sp,DR}(t) - \frac{\Delta T_{db,i}}{2}\right)$:

$$T_i^{in}(t) - \left(T_i^{sp,DR} - \frac{\Delta T_{db,i}}{2}\right) \geq -M \cdot D(t)$$

Force $D(t) = 0$ when $T_i^{in}(t) > \left(T_i^{sp,DR}(t) - \frac{\Delta T_{db,i}}{2}\right)$:

$$T_i^{in}(t) - \left(T_i^{sp,DR} - \frac{\Delta T_{db,i}}{2}\right) \leq M \cdot (1 - D(t))$$

The set of local constraints, $U_{i \in N} C_i$, continue as:
Avoid continuous change on HVAC temperature set point.

$$T_i^{sp,DR}(t) - T_i^{sp,DR}(t-1) \leq M \cdot z(t)$$

$$T_i^{sp,DR}(t) - T_i^{sp,DR}(t-1) \geq -M \cdot z(t)$$

$$\sum_{s=t}^{t-\tau_{SP}} z(t) \leq 1$$

$z(t) = \{0, 1\}$

Establish temperature set point limits.

$T_{min,i}^{sp} \leq T_i^{sp,DR}(t) \leq T_{max,i}^{sp}$

HVAC On/Off status.

$x_{cool,i}(t) = \{0,1\}$

In step S520, the set of global constraints is set to reduce the total load and satisfy the DR commitment.

$$\sum_{i \in N} P_{HVAC,i} \cdot x_{cool,i}(t) \leq \sum_{i \in N} (P_{Baseline,i}) - P_{Curtail}(t)$$

The problem formulated for N houses is divided into N sub-problems (one per household/business) using the Lagrange Relaxation approach. The global constraint described herein is included with the objective of each individual problem. The problem can be solved using the iterative Dual Ascent method.

In step S530, the household/business attempt to minimize a utility bill and a discomfort in an iterative manner when a new $\mu^k(t)$ is received for each household sub-problem.

$$\min_{y_i}(J_{bill,i} + J_{discomfort,i} + J_{aggregation,i})$$

$$J_{bill,i} = \sum_{t=1}^{T}(p_{buy}(t) \cdot \Delta t \cdot P_{HVAC,i} \cdot x_{cool,i}(t))$$

$$J_{discomfort,i} = \sum_{t=1}^{T}(T_i^{sp,DR}(t) - T_i^{SP,baseline}(t))^2$$

$$J_{aggregation,i} = \mu^k(t) \cdot \left(P_{HVAC,i} \cdot x_{cool,i}(t) - \frac{\sum_{i \in N} P_{Baseline,i}(t) - P_{Curtail}(t)}{N}\right)$$

Each household i is subject to the same local constraints $C_i$ as previously described.

For a dual variable update, the baseline profile minus the power that needs to be reduced is defined.

$$P_{imp}^{max}(t) = \sum_{i \in N}(P_{Baseline,i}(t)) - P_{Curtail}(t)$$

iEN

The dual variable is updated with the following rule:

$$\mu^{k+1}(t) = \max\left(\mu^k(t) + \alpha^k \cdot \frac{\partial L}{\partial \mu(t)}(x^k, \mu^k(t)), 0\right)$$

$$\frac{\partial L}{\partial \mu(t)}(x^k, \mu^k(t)) = \sum_{i \in N}\left(P_{HVAC,i}^{max} \cdot x_{cool,i}(t)\right) - P_{imp}^{max}(t)$$

A consensus network is used to update the dual variables to avoid a central coordinator in a fully distributed approach. In step S540, each node (household/business) updates its local estimation of the dual variables and shares the results with their immediate neighbors.

$$\hat{\mu}_i^{k+1}(t) = \hat{\mu}_i^k(t) + \sum_{j \in N_i} w_{ij}(\hat{\mu}_j^k(t) - \hat{\mu}_i^k(t)) + \alpha^k \cdot \widehat{\Delta P}_i^k(t)$$

$$\widehat{\Delta P}_i^{k+1}(t) = \widehat{\Delta P}_i^k(t) + \sum_{j \in N_i} w_{ij}(\widehat{\Delta P}_j^k(t) - \widehat{\Delta P}_i^k(t)) + \Delta P_i^{k+1}(t) - \Delta P_i^k(t)$$

where $$\Delta P_i^k(t) = P_{import_i}(t) - P_{export_i}(t) - \frac{P_{imp}^{max}(t)}{N}$$

The following numerical simulations were conducted to demonstrate the effectiveness of embodiments described herein. There was an aggregation of thirty households with the following considerations.

Data used for simulations belong to Austin, TX households downloaded from PecanStreet.org.

Jul. 11, 2015 was considered as the DR event day since it was the day with the highest load in July, 2015.

Parameters for the thermal model of each household/business were identified based on historical HVAC load and its correlation with the temperature outdoors.

Utility Tariff (Summer Day and Time-of-Use):
  Peak (from 3:00 pm to 8:00 pm): 28.60¢/kWh
  Off-peak (the rest of the day): 21.10¢/kWh
  Non-Bypassable-Charges (NBC): 2.50¢/kWh
Baseline Calculation:
  The baseline was calculated using the ten days before the DR event, excluding weekends and holidays.
Two Different DR services were considered:
  DR Event I:
    Power Bid: 9 kW
    DR Period: 4:00 pm-8:00 pm
    DR Compensation: 1 $/kWh
  DR Event II:
    Power Bid: 3 kW
    DR Period: 4:00 pm-8:00 pm
    DR Compensation: 1 $/kWh The economic results for the entire system of thirty households/businesses are illustrated in Table IV. A comparison was made between no DR event and the two DR events described above. The DR Event I reduced the power consumption of the HVAC 9 kW for 4 hours, while the DR Event II reduced the HVAC load only 3 kW for 4 hours. Therefore, the revenue for the system increased in DR Event I due to providing a large load reduction, while the thermal discomfort increased for both the DR Event I and the DR Event II.

TABLE IV

| Event Comparison | | | |
| --- | --- | --- | --- |
| Cost Type | DR Event I | DR Event II | No DR Event |
| Energy Bill ($) | $310.03 | $317.20 | $326.58 |
| DR Capacity Revenue ($) | −$36.00 | −$12.00 | $0.00 |
| Total System Cost ($) | $274.03 | $305.20 | $326.58 |
| Discomfort (° C. h) | 407.39 | 323.48 | 234.87 |

Figure 6:
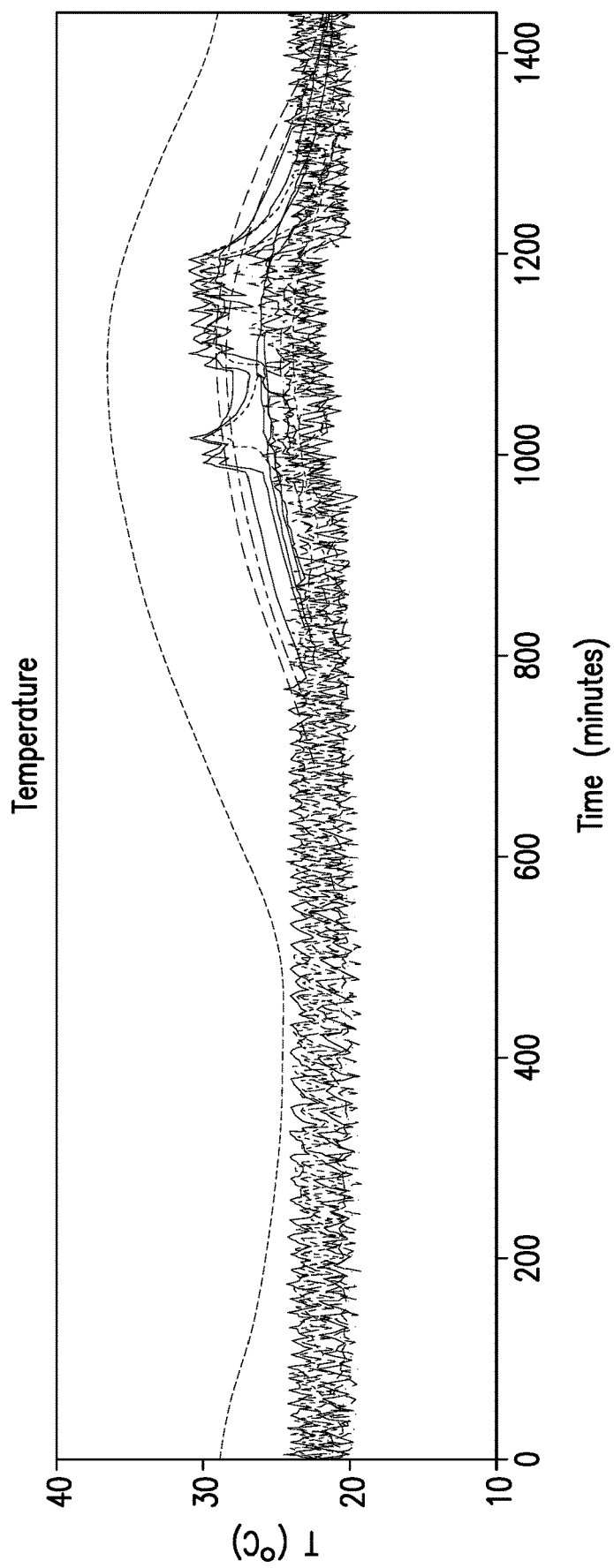
FIG. 6 is a graph illustrating the temperature inside the household/business compared with the temperature outside the households/businesses for thirty households/businesses according to one example.
Figure 7:
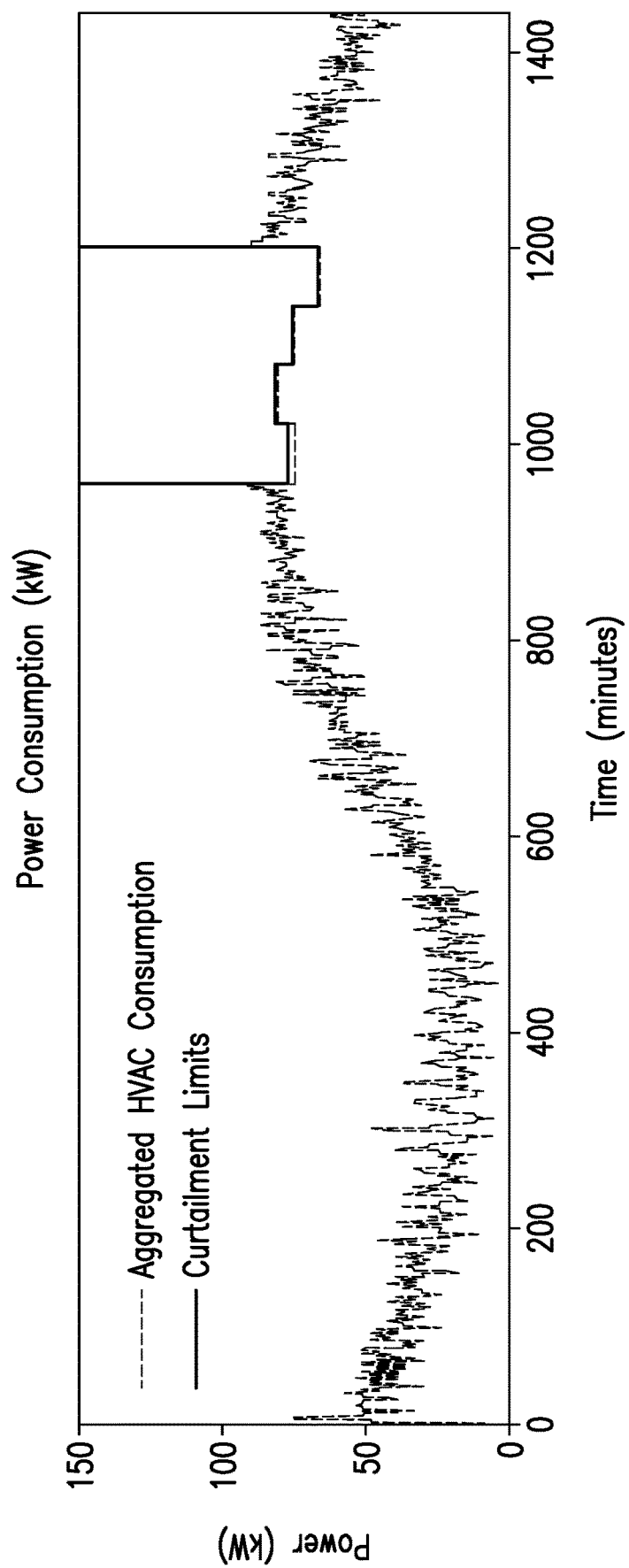
FIG. 7 is a graph illustrating the aggregated power consumption of all HVAC units for thirty households/businesses according to one example.

The graphs of FIG. 6 and FIG. 7 illustrate the behavior of the cooperative distributed system described herein. FIG. 6 is a graph illustrating the temperature inside (i.e. indoors) the household/business compared with the temperature outside (i.e. outdoors) the household/business for thirty households/businesses (considered the same for all the households/businesses). In the graph of FIG. 6, it is observed that the temperature inside the house/business specifically increases during the DR period in order to reduce the power consumption. FIG. 7 is a graph illustrating the aggregated power consumption of all HVAC units for thirty households/businesses. FIG. 7 also illustrates how the DR commitment is met from 4 pm to 8 pm.

Figure 8A:
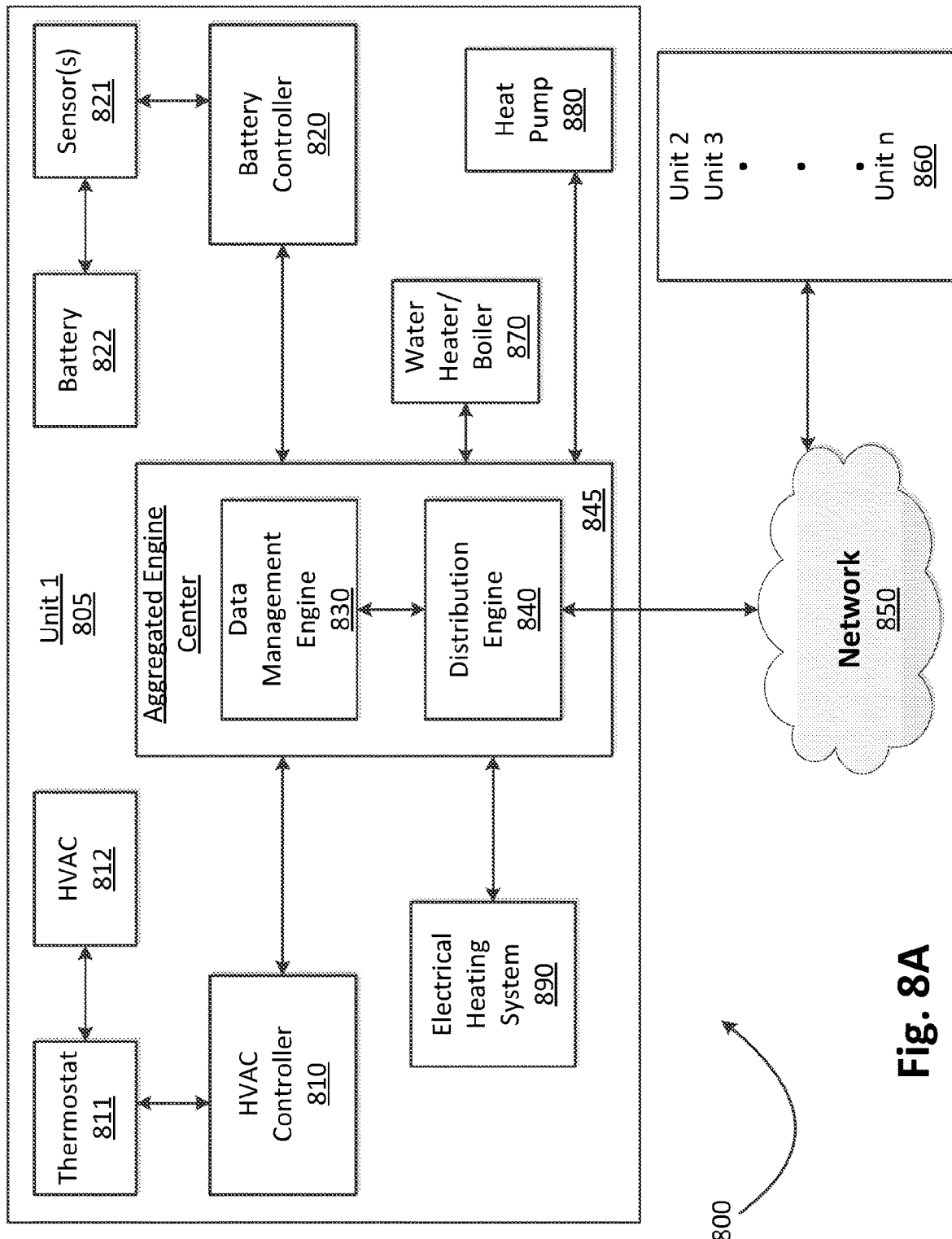
FIG. 8A is a block diagram illustrating an aggregated distribution system according to one example.

FIG. 8A is a block diagram illustrating an aggregated distribution system 800 used with embodiments described herein. An HVAC controller 810 is connected to a thermostat 811, which is connected to and configured to set the temperature setpoint for the thermostat 811 of the HVAC unit 812. The HVAC controller 810 is configured with circuitry to execute the steps of algorithm 500.

FIG. 8A also illustrates a battery controller 820. The battery controller 820 is connected to a sensor(s) 821, such as a charge and/or power sensor, which is connected to and configured to control a battery 822. The battery controller 820 is configured with circuitry to execute the steps of algorithm 100.

FIG. 8A illustrates an HVAC controller 810 and associated HVAC unit 812, and a battery controller 820 and associated battery unit 822. However, Unit 1 805 can include either HVAC controller 810 and HVAC unit 812, or the battery controller 820 and battery unit 822. Other thermostatically-controlled appliances (TCAs) illustrated in Unit 1 805, include a water heater/boiler 870, a heat pump 880, and an electrical heating system 890. Each of the water heater/boiler 870, the heat pump 880, and the electrical heating system 890 would have a respective controller and a control mechanism. However, these have been omitted so as to simplify the aggregated distribution system 800.

A controller, such as HVAC controller 810, battery controller 820, a water heater controller, a water boiler controller, a heat pump controller, or an electrical heating system controller can be referred to as a Home Energy Management System (HEMS) controller.

The controller can also be a local microcontroller or a Digital Signal Processor (DSP), which includes processing circuitry configured to execute one or more algorithms described herein, such as algorithm 100 and algorithm 500. The controller is configured to communicate with other controllers within the aggregated distribution system via a communication network. In a cloud-computing environment, controlling software runs within the cloud data center. Control commands are transmitted through the Internet to each controller within the respective houses/businesses.

FIG. 8A also illustrates an aggregated data management engine 830. Aggregated data management engine 830 has processing circuitry configured to retrieve the HVAC energy usage profile from the HVAC controller, and retrieve the battery energy usage profile from the battery controller.

FIG. 8A also illustrates a distribution engine 840. Distribution engine 840 has processing circuitry configured to forward the HVAC and battery dual variables to a first neighboring unit of the aggregated distribution system, via a communications network; receive the HVAC and battery dual variables from one or more neighboring units of the aggregated distribution system via the communications network; update the HVAC energy usage profile with the HVAC dual variables; and update the battery energy usage profile with the battery dual variables.

The HVAC controller 810, thermostat 811, HVAC 812, battery controller 820, sensor(s) 821, battery 822, and aggregated engine center 845 are positioned within Unit 1 805. Unit 1 can be defined as a contained physical structure, such as a house, business, commercial building, or other physically-contained structure.

FIG. 8A illustrates the aggregated data management engine 830 and the distribution engine 840 as two separate entities. However, the aggregated data management engine 830 and the distribution engine 840 could be combined into one physical structure or as a plurality of physical structures working in parallel. In addition, one or both of the HVAC controller 810 and the battery controller 820 can be combined into a single structure with the aggregated data management engine 830 and the distribution engine 840.

FIG. 8A also illustrates a network 850. In one embodiment, network 850 is an Averaging Consensus Network. Network 850 is connected to a plurality of other household/business units 860, which are part of the aggregated distribution system 800. Each of Unit 2, Unit 3, etc. includes the same features as Unit 1 805.

Figure 8B:
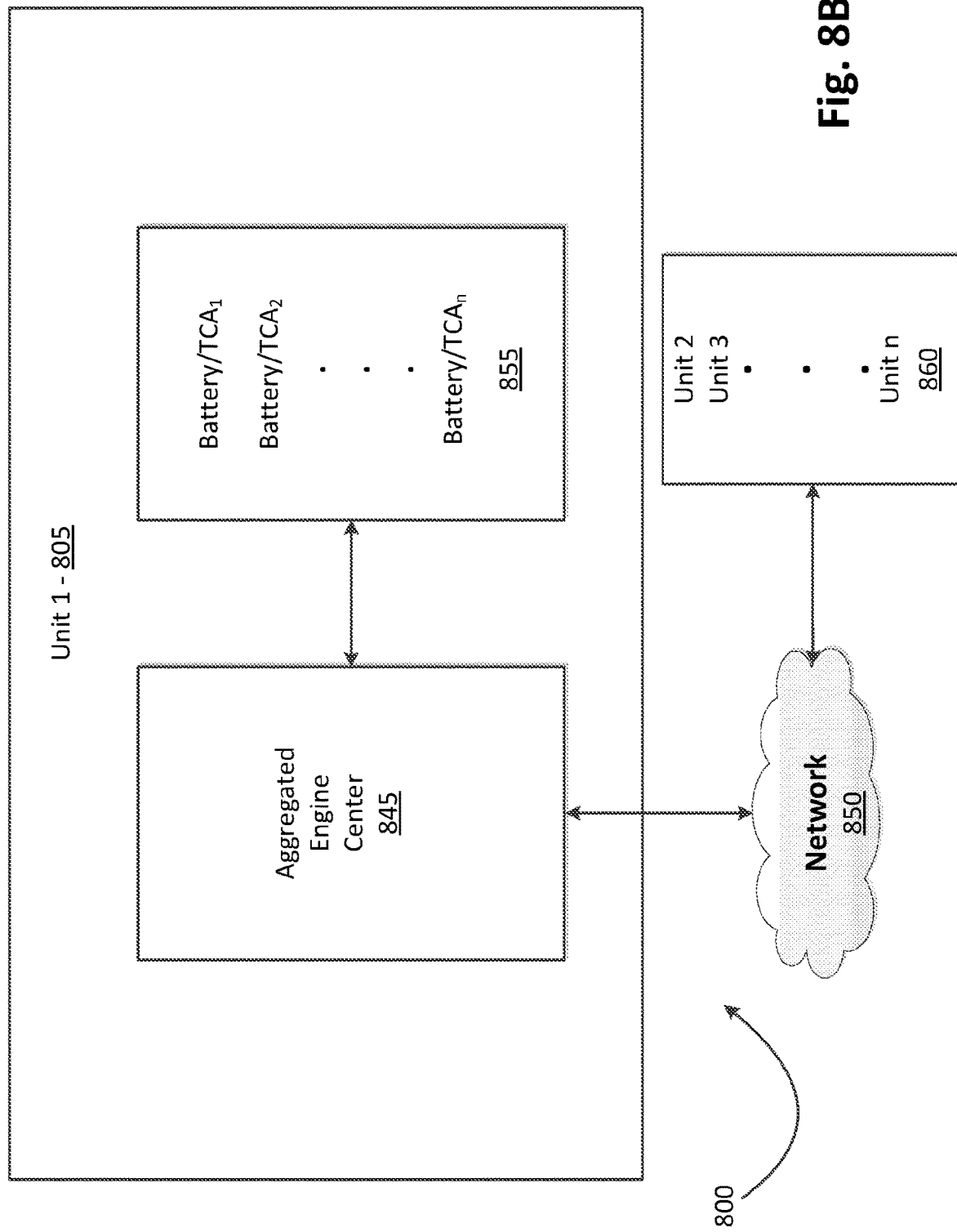
FIG. 8B is a block diagram illustrating a generic schematic of aggregated distribution system according to one example.

FIG. 8B is a block diagram illustrating a generic schematic of aggregated distribution system 800. In FIG. 8B, the data management engine 830 and the distribution engine 840 of FIG. 8A have been combined into a single structure as the aggregated engine center 845 of Unit 1 805. One or more TCAs and/or batteries 855 are also represented, which can include but are not limited to HVAC 812, battery 822, water heater/boiler 870, heat pump 880 and/or electrical heating system 890. Network 850 interconnects Unit 1 805 with one or more other units 860 within the aggregated distribution system 800.

In one implementation, the functions and processes of the aggregated distribution system 800 can be implemented in part by a computer 900 illustrated in FIG. 9. In particular, the HVAC controller 810, the battery controller 820, the data management engine 830 and/or the distribution engine 840 can be implemented by the computer 900, either separately or together as one or more units.

FIG. 9 illustrates a hardware description of the computer 900 according to exemplary embodiments. In FIG. 9, the computer 900 includes a CPU 901 which performs the processes described herein. The process data and instructions may be stored in memory 902. These processes and instructions may also be stored on a storage medium disk 904 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 900 communicates, such as a server or computer.

Further, the claimed advancements may be provided as a utility application, background daemon, or component of an operating system, or combination thereof, executing in conjunction with CPU 901 and an operating system such as MICROSOFT® WINDOWS®, UNIX®, ORACLE® SOLARIS®, LINUX®, APPLE MACOS® and other systems known to those skilled in the art.

In order to achieve the computer 900, the hardware elements may be realized by various circuitry elements, known to those skilled in the art. For example, CPU 901 may be a Xenon® or Core® processor from Intel Corporation of America or an Opteron® processor from AMD of America, or may be other processor types that would be recognized by one of ordinary skill in the art. Alternatively, the CPU 901 may be implemented on an FPGA, ASIC, PLD or using discrete logic circuits, as one of ordinary skill in the art would recognize. Further, CPU 901 may be implemented as multiple processors cooperatively working in parallel to perform the instructions of the inventive processes described above.

The computer 900 in FIG. 9 also includes a network controller 906, such as an Intel Ethernet PRO network interface card from Intel Corporation of America, for interfacing with network 850, such as the network 850 in FIG. 8. As can be appreciated, the network 850 can be a public network, such as the Internet, or a private network such as LAN or WAN network, or any combination thereof and can also include PSTN or ISDN sub-networks. The network 850 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 900 further includes a display controller 908, such as a NVIDIA® GeForce® GTX or Quadro® graphics adaptor from NVIDIA Corporation of America for interfacing with display 910, such as a Hewlett Packard® HPL2445w LCD monitor. A general purpose I/O interface 912 interfaces with a keyboard and/or mouse 914 as well as an optional touch screen panel 916 on or separate from display 910. General purpose I/O interface 912 also connects to a variety of peripherals 918 including printers and scanners, such as an OfficeJet® or DeskJet® from Hewlett Packard.

The general purpose storage controller 920 connects the storage medium disk 904 with communication bus 922, which may be an ISA, EISA, VESA, PCI, or similar, for interconnecting all of the components of the computer 900. A description of the general features and functionality of the display 910, keyboard and/or mouse 914, as well as the display controller 908, storage controller 920, network controller 906, and general purpose I/O interface 912 is omitted herein for brevity as these features are known.

FIG. 9 includes a charge sensor 821, such as the Unit 1 sensor 821 connected to the Unit 1 battery 822 in FIG. 8. FIG. 9 also includes a thermostat 811, such as the Unit 1 thermostat 811 connected to the Unit 1 HVAC 812 in FIG. 8. A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed. Embodiments described herein can be implemented in conjunction with one or more of the devices described above with reference to FIG. 9. Embodiments are a combination of hardware and software, and processing circuitry by which the software is implemented.

FIG. 10 is a flowchart for a first method 1000 of improving energy resource distribution. In step 1010, a utility operating cost is determined for an aggregated cluster of entities within a power grid. In one embodiment, the aggregated cluster of entities includes an aggregated cluster of individual households or an aggregated cluster of individual businesses.

In step 1020, an energy storage degradation cost of respective energy storage devices used by the aggregated cluster of entities is calculated. The energy storage degradation cost includes one or more local constraints of each energy storage device of the energy storage devices and one or more global constraints for a combination of the energy storage devices.

In step 1030, a revenue earned for the aggregated cluster of entities is calculated by providing energy from the energy storage devices to the power grid. In one embodiment, the energy storage devices include one or more batteries.

In step 1040, a combined operating cost for the aggregated cluster of entities is determined from a sum of the utility operating cost and the calculated energy storage degradation cost minus the calculated revenue earned. Stated mathematically, operating cost=(utility operating cost)+(calculated energy storage degradation cost)— (calculated revenue earned).

In step 1050, the one or more global constraints and respective dual variables is combined with the determined combined operating cost for each entity of the aggregated cluster of entities.

In step 1060, the dual variables for each entity of the aggregated cluster of entities are updated. In one embodiment, a Dual Decomposition method can be applied to derive an iteration of said each entity of the aggregated cluster of entities to calculate a local estimation of a net energy exchange.

In step 1070, the updated dual variables of said each entity of the aggregated cluster of entities is forwarded to one or more respective neighboring entities within the aggregated cluster of entities.

In step 1080, an improved local estimate of the dual variables for said each entity of the aggregated cluster of entities is calculated from local estimates of the dual variables from the one or more respective neighboring entities.

In step 1090, energy resource distribution is improved by executing the improved local estimate of the dual variables for said each entity of the aggregated cluster of entities within the power grid. The improving energy resource distribution reallocates available energy among the aggregated cluster of entities to reduce a load within the power grid.

Figure 11:
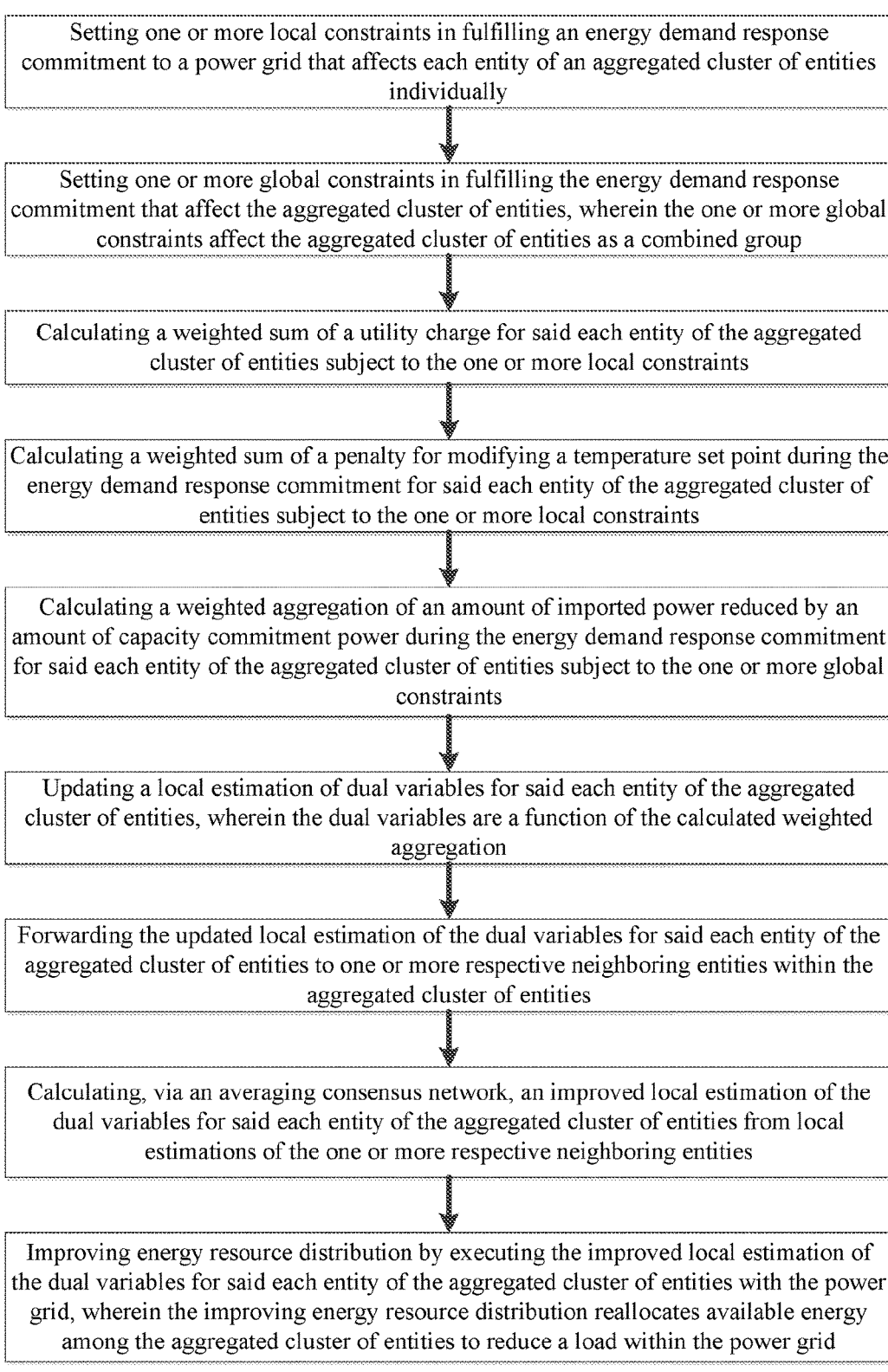
FIG. 11 is a flowchart for a second method of improving energy resource distribution according to one example.

FIG. 11 is a flowchart for a second method 1100 of improving energy resource distribution. In step 1110, one or more local constraints are set in fulfilling an energy demand response commitment to a power grid that affects each entity of an aggregated cluster of entities individually.

In step 1120, one or more global constraints are set in fulfilling the energy demand response commitment that affects the aggregated cluster of entities. The one or more global constraints affect the aggregated cluster of entities as a combined group.

In step 1130, a weighted sum of a utility charge is calculated for said each entity of the aggregated cluster of entities subject to the one or more local constraints. In one embodiment, the one or more local constraints can include one or more of a thermal model, a dead-band control model, avoiding a continuous change in temperature set points, a set of temperature set point limits, and an on/off status of a thermostatically-controlled appliance (TCA).

In step 1140, a weighted sum of a penalty for modifying a temperature set point during the energy demand response commitment is calculated for said each entity of the aggregated cluster of entities subject to the one or more local constraints. In one embodiment, setting the one or more local constraints and said setting the one or more global constraints are achieved via controlling an HVAC unit for said each entity of the aggregated cluster of entities.

In step 1150, a weighted aggregation of an amount of imported power reduced by an amount of capacity commitment power during the energy demand response commitment is calculated for said each entity of the aggregated cluster of entities subject to the one or more global constraints. In one embodiment, setting the one or more local constraints and said setting the one or more global constraints are implemented via the HVAC unit for said each entity of the aggregated cluster of entities for one of a heating mode and a cooling mode.

In step 1160, a local estimation of dual variables is updated for said each entity of the aggregated cluster of entities. The dual variables are a function of the calculated weighted aggregation.

In step 1170, the updated local estimation of the dual variables is forwarded for said each entity of the aggregated cluster of entities to one or more respective neighboring entities within the aggregated cluster of entities. In one embodiment, the aggregated cluster of entities includes an aggregated cluster of individual households or an aggregated cluster of individual businesses.

In step 1180, an improved local estimation of the dual variables is calculated for said each entity of the aggregated cluster of entities from local estimations of the one or more respective neighboring entities. The calculating is executed via an averaging consensus network.

In step 1190, energy resource distribution is improved by executing the improved local estimation of the dual variables for said each entity of the aggregated cluster of entities with the power grid. The improving energy resource distribution reallocates available energy among the aggregated cluster of entities to reduce a load within the power grid.

Embodiments described herein for a cooperative distributed energy scheduling algorithm allow an aggregated cluster of households or businesses to use their individual energy storage devices to cooperatively provide a demand response service to the power grid. In addition, the individual loads of each household or business can be met, while still reducing household or business operational costs.

Some conventional systems and methods provide a centralized model or architecture. However, this provides an avenue for only large entities. Other systems and methods model the uncertainties in an aggregated HVAC load using a state queueing model. However, there is no controlling of the HVAC. Another HVAC load control strategy follows a targeted load curve, but it is based on a centralized multi-objective system model.

Embodiments described herein provide several advantages including a minimization of global system operating costs, while also providing the demand response service required by an ISO. In addition, a fully distributed approach is provided with a global optimum solution in which the algorithm runs locally in each home energy management system. By cooperation with neighboring households, it is able to schedule operation of a storage energy device in an optimum manner for each household.

A scalable solution is provided by dividing the computational burden across each household controller; therefore, only local communication is needed. The remaining useful life of the energy storage device is maximized, privacy is protected since individual household information is not disclosed, and the system is robust to a single point-of-failure.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes, and algorithms described herein may be performed in hardware or software executed by hardware, including computer processors and/or programmable circuits configured to execute program code and/or computer instructions to execute the functions, processes, and algorithms described herein. Additionally, an implementation may be performed on modules or hardware not identical to those described. Accordingly, other implementations are within the scope that may be claimed.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

The invention claimed is:

1. A method of improving energy resource distribution, comprising:
   determining a utility operating cost for an aggregated cluster of entities within a power grid;
   calculating an energy storage degradation cost of respective energy storage devices used by the aggregated cluster of entities, wherein the energy storage degradation cost includes one or more local constraints of each energy storage device of the energy storage devices and one or more global constraints for a combination of the energy storage devices;
   calculating a revenue earned for the aggregated cluster of entities by providing energy from the energy storage devices to the power grid;
   determining a combined operating cost for the aggregated cluster of entities from a sum of the utility operating cost and the calculated energy storage degradation cost minus the calculated revenue earned;
   combining the one or more global constraints and respective dual variables with the determined combined operating cost for each entity of the aggregated cluster of entities;
   updating the dual variables for each entity of the aggregated cluster of entities;
   forwarding the updated dual variables of said each entity of the aggregated cluster of entities to one or more respective neighboring entities within the aggregated cluster of entities;
   calculating, via an averaging consensus network, an improved local estimate of the dual variables for said each entity of the aggregated cluster of entities from local estimates of the dual variables from the one or more respective neighboring entities;
   calculating a weighted sum of a utility charge for said each entity of the aggregated cluster of entities subject to the one or more local constraints;
   calculating a weighted sum of a penalty for modifying a temperature set point during an energy demand response commitment for said each entity of the aggregated cluster of entities subject to the one or more local constraints;
   calculating a weighted aggregation of an amount of imported power reduced by an amount of capacity commitment power during the energy demand response commitment for said each entity of the aggregated cluster of entities subject to the one or more global constraints; and
   improving energy resource distribution by executing the improved local estimate of the dual variables for said each entity of the aggregated cluster of entities within the power grid, wherein the improving energy resource distribution reallocates available energy among the aggregated cluster of entities to reduce a load within the power grid.

2. The method of claim 1, wherein the one or more local constraints include one or more of energy limits of the energy storage devices, power limits of the energy storage devices, and power limits of the power grid.

3. The method of claim 1, wherein the energy storage devices include one or more batteries.

4. The method of claim 1, further comprising:
applying a Dual Decomposition method to derive an iteration of said each entity of the aggregated cluster of entities to calculate a local estimation of a net energy exchange.

5. The method of claim 1, wherein the aggregated cluster of entities includes an aggregated cluster of individual households or an aggregated cluster of individual businesses.

6. A method of improving energy resource distribution, comprising:
setting one or more local constraints in fulfilling an energy demand response commitment to a power grid that affects each entity of an aggregated cluster of entities individually;
setting one or more global constraints in fulfilling the energy demand response commitment that affects the aggregated cluster of entities, wherein the one or more global constraints affect the aggregated cluster of entities as a combined group;
calculating a weighted sum of a utility charge for said each entity of the aggregated cluster of entities subject to the one or more local constraints;
calculating a weighted sum of a penalty for modifying a temperature set point during the energy demand response commitment for said each entity of the aggregated cluster of entities subject to the one or more local constraints;
calculating a weighted aggregation of an amount of imported power reduced by an amount of capacity commitment power during the energy demand response commitment for said each entity of the aggregated cluster of entities subject to the one or more global constraints;
updating a local estimation of dual variables for said each entity of the aggregated cluster of entities, wherein the dual variables are a function of the calculated weighted aggregation;
forwarding the updated local estimation of the dual variables for said each entity of the aggregated cluster of entities to one or more respective neighboring entities within the aggregated cluster of entities;
calculating, via an averaging consensus network, an improved local estimation of the dual variables for said each entity of the aggregated cluster of entities from local estimations of the one or more respective neighboring entities; and
improving energy resource distribution by executing the improved local estimation of the dual variables for said each entity of the aggregated cluster of entities with the power grid, wherein the improving energy resource distribution reallocates available energy among the aggregated cluster of entities to reduce a load within the power grid.

7. The method of claim 6, wherein the one or more local constraints include one or more of a thermal model, a dead-band control model, avoiding a continuous change in temperature set points, a set of temperature set point limits, and an on/off status of a thermostatically-controlled appliance (TCA).

8. The method of claim 7, wherein the TCA includes one or more of a heating ventilation and air conditioning (HVAC) unit, a water heater, a water boiler, a heat pump, and an electrical heating system.

9. The method of claim 6, wherein the one or more global constraints include a difference between a first amount of energy used during a non-energy demand response commitment and a second amount of energy used during an energy demand response commitment.

10. The method of claim 6, wherein the aggregated cluster of entities includes an aggregated cluster of individual households or an aggregated cluster of individual businesses.

11. The method of claim 6, wherein said setting the one or more local constraints and said setting the one or more global constraints are achieved via controlling a heating ventilation and air conditioning (HVAC) unit for said each entity of the aggregated cluster of entities.

12. The method of claim 11, wherein said setting the one or more local constraints and said setting the one or more global constraints are implemented via the HVAC unit for said each entity of the aggregated cluster of entities for one of a heating mode and a cooling mode.

13. An aggregated distribution system comprising:
a heating ventilation and air conditioning (HVAC) controller configured to retrieve an HVAC energy usage profile;
a battery controller configured to retrieve a battery energy usage profile;
an aggregated data management engine having processing circuitry configured to
retrieve the HVAC energy usage profile from the HVAC controller, and
retrieve the battery energy usage profile from the battery controller;
a distribution engine having processing circuitry configured to
forward a first set of HVAC dual variables and forward a first set of battery dual variables to a first neighboring unit of the aggregated distribution system, via a communications network,
receive one or more additional sets of HVAC dual variables and one or more additional sets of battery dual variables from one or more neighboring units of the aggregated distribution system via the communications network,
update the HVAC energy usage profile with the one or more additional sets of HVAC dual variables, and
update the battery energy usage profile with the one or more additional sets of battery dual variables;
an HVAC unit configured to execute, via the HVAC controller, the updated HVAC energy usage profile to a power grid; and
a battery configured to execute, via the battery controller, the updated battery energy usage profile to the power grid,
wherein the updated HVAC energy usage profile and the updated battery energy usage profile improves energy resource distribution by reallocating available energy among the aggregated distribution system to reduce a load within the power grid, and
wherein the HVAC controller comprises circuitry configured to:
set one or more HVAC local constraints in fulfilling an energy demand response commitment during a response demand period that affects each of the HVAC units individually;
set one or more HVAC global constraints in fulfilling the energy demand response commitment that affect an aggregated cluster of HVAC units, wherein the one or more global constraints affect the aggregated cluster of HVAC units as a combined group;

calculate a weighted sum of a utility charge for said each of the HVAC units subject to the one or more local constraints;

calculate a weighted sum of a penalty for modifying a temperature set point during the energy demand response commitment for said each of the HVAC units subject to the one or more local constraints;

calculate a weighted aggregation of an amount of imported power reduced by an amount of capacity commitment power during the energy demand response commitment for said each of the HVAC units subject to the one or more global constraints;

update a local estimation of dual variables for said each of the HVAC units, wherein the dual variables are a function of the weighted aggregation; and forward the updated local estimation of the dual variables of said each of the HVAC units to one or more respective neighboring HVAC units within the aggregated cluster of HVAC units.

14. The aggregated distribution system of claim 13, wherein the one or more HVAC local constraints include one or more of a thermal model, a dead-band control model, avoiding a continuous change in temperature set points, a set of temperature set point limits, and an on/off status of the HVAC unit.

15. The aggregated distribution system of claim 13, wherein the one or more HVAC global constraints include a difference of a first amount of energy used during a non-energy demand response commitment and a second amount of energy used during the energy demand response commitment.

16. The aggregated distribution system of claim 13, wherein the battery controller comprises circuitry configured to:

determine a utility operating cost for an aggregated cluster of batteries within the power grid;

calculate an energy storage degradation cost of the aggregated cluster of batteries, wherein the energy storage degradation cost includes one or more battery local constraints of each of the batteries and one or more battery global constraints for the aggregated cluster of batteries;

calculate a revenue earned for the aggregated cluster of batteries by providing energy obtained from the aggregated cluster of batteries to the power grid;

determine a combined operating cost for the aggregated cluster of batteries from a sum of the utility operating cost and the energy storage degradation cost minus the revenue earned;

update dual variables for each battery of the aggregated cluster of batteries; and forward the updated dual variables of said each battery of the aggregated cluster of batteries to one or more respective neighboring batteries within the aggregated cluster of batteries.

17. The aggregated distribution system of claim 16, wherein the one or more battery local constraints include one or more of energy limits of the batteries, power limits of the batteries, and power limits of the power grid.

* * * * *